US010460370B2

(12) United States Patent
Borovikov et al.

(10) Patent No.: US 10,460,370 B2
(45) Date of Patent: Oct. 29, 2019

(54) PROXY AGENT INTERFACE TO PEER-TO-PEER TRANSACTIONS

(71) Applicant: Electronic Arts Inc., Redwood City, CA (US)

(72) Inventors: Igor Borovikov, Foster City, CA (US); Mohsen Sardari, Redwood City, CA (US); John Kolen, Half Moon Bay, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 387 days.

(21) Appl. No.: 15/475,026

(22) Filed: Mar. 30, 2017

(65) Prior Publication Data
US 2018/0285951 A1    Oct. 4, 2018

(51) Int. Cl.
*G06Q 30/00* (2012.01)
*G06Q 30/06* (2012.01)
(Continued)

(52) U.S. Cl.
CPC ......... *G06Q 30/0619* (2013.01); *G06F 21/00* (2013.01); *G06Q 20/123* (2013.01);
(Continued)

(58) Field of Classification Search
CPC ........... G06Q 30/0619; G06Q 30/0613; G06Q 30/0601; G06Q 20/4016; G06Q 20/123;
(Continued)

(56) References Cited

U.S. PATENT DOCUMENTS

| 2011/0178906 | A1* | 7/2011 | Joye | G06Q 40/00 705/35 |
| 2015/0317349 | A1* | 11/2015 | Chao | G06F 16/2336 707/615 |
| 2018/0276632 | A1* | 9/2018 | Gandevia | G06Q 30/08 |

FOREIGN PATENT DOCUMENTS

JP     2015-79715 G * 12/2015    ............. G06F 17/30

OTHER PUBLICATIONS

New York University; "System and Method for Estimating Audience Interest" in Patent Application Approval Process (USPTO 20150242751); Marketing Weekly News [Atlanta] Sep. 19, 2015: 247.*

* cited by examiner

*Primary Examiner* — Yogesh C Garg
(74) *Attorney, Agent, or Firm* — McDermott Will & Emery LLP

(57) ABSTRACT

Various aspects of the subject technology relate to systems, methods, and machine-readable media for a proxy agent as an intermediary that hosts electronic exchange transactions between distributing computing devices to reduce the number of fraudulent transactions with respect to items of a multiplayer game. The proxy agent listens for events such as an item being listed for sale on an electronic marketplace associated with the multiplayer game, or a listed item being purchased from the electronic marketplace, before the proxy agent transitions to a state for initiating purchase transactions to obtain additional items from users and thereafter automatically listing the purchased items for sale on the electronic marketplace. The proxy agent serves as a conduit for sale and purchase transactions to restrict transactions from occurring outside of the electronic marketplace and to map pricing data for a given item to market data trends over the transactional life of the item.

20 Claims, 17 Drawing Sheets

(51) Int. Cl.
   *G06Q 20/22* (2012.01)
   *H04L 9/00* (2006.01)
   *G06F 21/00* (2013.01)
   *G06Q 20/38* (2012.01)
   *G06Q 20/12* (2012.01)
   *G06Q 20/40* (2012.01)

(52) U.S. Cl.
   CPC ....... *G06Q 20/223* (2013.01); *G06Q 20/3829* (2013.01); *G06Q 20/4016* (2013.01); *G06Q 30/0601* (2013.01); *G06Q 30/0613* (2013.01); *H04L 9/00* (2013.01)

(58) Field of Classification Search
   CPC .. G06Q 20/223; G06Q 20/3829; G06F 21/00; H04L 9/00
   USPC .................................. 705/26.44, 26.41, 26.1
   See application file for complete search history.

PROXY AGENT INTERFACE TO PEER-TO-PEER TRANSACTIONS

BACKGROUND

Field

The present disclosure generally relates to a computer-operated multiplayer game, and more particularly to a proxy agent interface for peer-to-peer transactions associated with the computer-operated multiplayer game.

Description of the Related Art

Video games, such as sports-themed video games, provide ever increasing realistic game-playing experiences, including access to an electronic marketplace for users of the game to transfer digital assets from the game, such as avatars or player agents, with one another. Traditional electronic marketplaces provide a platform for users to create and respond to item listings, although transactions associated with a given digital asset can occur outside of the electronic marketplace.

SUMMARY

The disclosed system provides for an intermediate entity such as a proxy agent to host electronic exchange transactions between distributing computing devices to reduce and/or prevent fraudulent transactions with respect to items of a multiplayer video game. The proxy agent listens for events such as a user listing an item for sale on an electronic marketplace associated with the multiplayer video game, or a user purchasing an item listed for sale on the electronic marketplace, before deciding to initiate purchase transactions to obtain additional items from users listing their items for sale. Thereafter, the purchased item will be listed for sale on the electronic marketplace. The proxy agent may serve as a conduit for sale transactions and purchase transactions in order to restrict transactions from occurring outside of the electronic marketplace and to map pricing data for a given item to market data trends over the transactional life of the item.

According to one embodiment of the present disclosure, a computer-implemented method is provided. The method includes initiating a connection to an application programming interface (API) of an online transaction repository accessible to a plurality of participant devices in a computer-operated multiplayer game, in which the online transaction repository includes a collection of items associated with the computer-operated multiplayer game, and where the connection is initiated by a proxy agent including a plurality of shards. The method also includes associating a first shard of the plurality of shards to a peer-to-peer transaction channel to the online transaction repository, in which at least two of the plurality of participant devices interact with one another over the peer-to-peer transaction channel. The method also includes determining a first item from the collection of items having a transactional history that does not exceed a threshold number of transactions, in which the first item is associated with a first item listing accessible exclusive to the first shard. The method also includes providing the first item to the peer-to-peer transaction channel via the first shard. The method also includes determining that a trigger event associated with the first item occurred on the peer-to-peer transaction channel. The method also includes obtaining pricing data associated with the trigger event from the peer-to-peer transaction channel. The method also includes generating a weighted distribution of the obtained pricing data. The method also includes determining a base value for the first item from the weighted distribution. The method also includes applying the base value to a second item of a same type as that of the first item for an electronic acquisition transaction with the online transaction repository by the proxy agent, in which the second item is associated with a second item listing accessible exclusive to a second shard of the plurality of shards.

According to one embodiment of the present disclosure, a system is provided including an online transaction repository and a proxy agent communicably coupled to the online transaction repository. The proxy agent is configured to initiate a connection to an application programming interface (API) of an online transaction repository accessible to a plurality of participant devices in a computer-operated multiplayer game, in which the online transaction repository includes a collection of items associated with the computer-operated multiplayer game, and where the connection is initiated by a proxy agent including a plurality of shards. The proxy agent is configured to associate a first shard of the plurality of shards to a peer-to-peer transaction channel to the online transaction repository, in which at least two of the plurality of participant devices interact with one another over the peer-to-peer transaction channel. The proxy agent is configured to determine a first item from the collection of items having a transactional history that does not exceed a threshold number of transactions, in which the first item is associated with a first item listing accessible exclusive to the first shard. The proxy agent is configured to provide the first item to the peer-to-peer transaction channel via the first shard. The proxy agent is configured to determine that a trigger event associated with the first item occurred on the peer-to-peer transaction channel. The proxy agent is configured to obtain pricing data associated with the trigger event from the peer-to-peer transaction channel. The proxy agent is configured to generate a weighted distribution of the obtained pricing data. The proxy agent is configured to determine a base value for the first item from the weighted distribution. The proxy agent is configured to apply the base value to a second item of a same type as that of the first item for an electronic acquisition transaction with the online transaction repository by the proxy agent, in which the second item is associated with a second item listing accessible exclusive to a second shard of the plurality of shards.

According to one embodiment of the present disclosure, a non-transitory computer readable storage medium is provided including instructions that, when executed by a processor, cause the processor to perform a method. The method includes initiating a connection to an application programming interface (API) of an online transaction repository accessible to a plurality of participant devices in a computer-operated multiplayer game, in which the online transaction repository includes a collection of items associated with the computer-operated multiplayer game, and where the connection is initiated by a proxy agent including a plurality of shards. The method also includes associating a first shard of the plurality of shards to a peer-to-peer transaction channel to the online transaction repository, in which at least two of the plurality of participant devices interact with one another over the peer-to-peer transaction channel. The method also includes determining a first item from the collection of items having a transactional history that does not exceed a threshold number of transactions, in which the first item is associated with a first item listing accessible exclusive to the first shard. The method also includes providing the first item to the peer-to-peer transaction channel via the first shard. The method also includes determining that a trigger event associated with the first item occurred on the peer-to-peer transaction channel. The method also includes obtaining pricing data associated with the trigger event from the peer-to-peer transaction channel. The method also includes generating a weighted distribution of the obtained pricing data. The method also includes determining a base value for the first item from the weighted distribution. The method also includes applying the base value to a second item of a same type as that of the first item for an electronic acquisition transaction with the online transaction repository by the proxy agent, in which the second item is associated with a second item listing accessible exclusive to a second shard of the plurality of shards.

According to one embodiment of the present disclosure, a system is provided that includes means for storing instructions, and means for executing the stored instructions that, when executed by the means, cause the means to perform a method. The method includes initiating a connection to an application programming interface (API) of an online transaction repository accessible to a plurality of participant devices in a computer-operated multiplayer game, in which the online transaction repository includes a collection of items associated with the computer-operated multiplayer game, and where the connection is initiated by a proxy agent including a plurality of shards. The method also includes associating a first shard of the plurality of shards to a peer-to-peer transaction channel to the online transaction repository, in which at least two of the plurality of participant devices interact with one another over the peer-to-peer transaction channel. The method also includes determining a first item from the collection of items having a transactional history that does not exceed a threshold number of transactions, in which the first item is associated with a first item listing accessible exclusive to the first shard. The method also includes providing the first item to the peer-to-peer transaction channel via the first shard. The method also includes determining that a trigger event associated with the first item occurred on the peer-to-peer transaction channel. The method also includes obtaining pricing data associated with the trigger event from the peer-to-peer transaction channel. The method also includes generating a weighted distribution of the obtained pricing data. The method also includes determining a base value for the first item from the weighted distribution. The method also includes applying the base value to a second item of a same type as that of the first item for an electronic acquisition transaction with the online transaction repository by the proxy agent, in which the second item is associated with a second item listing accessible exclusive to a second shard of the plurality of shards.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
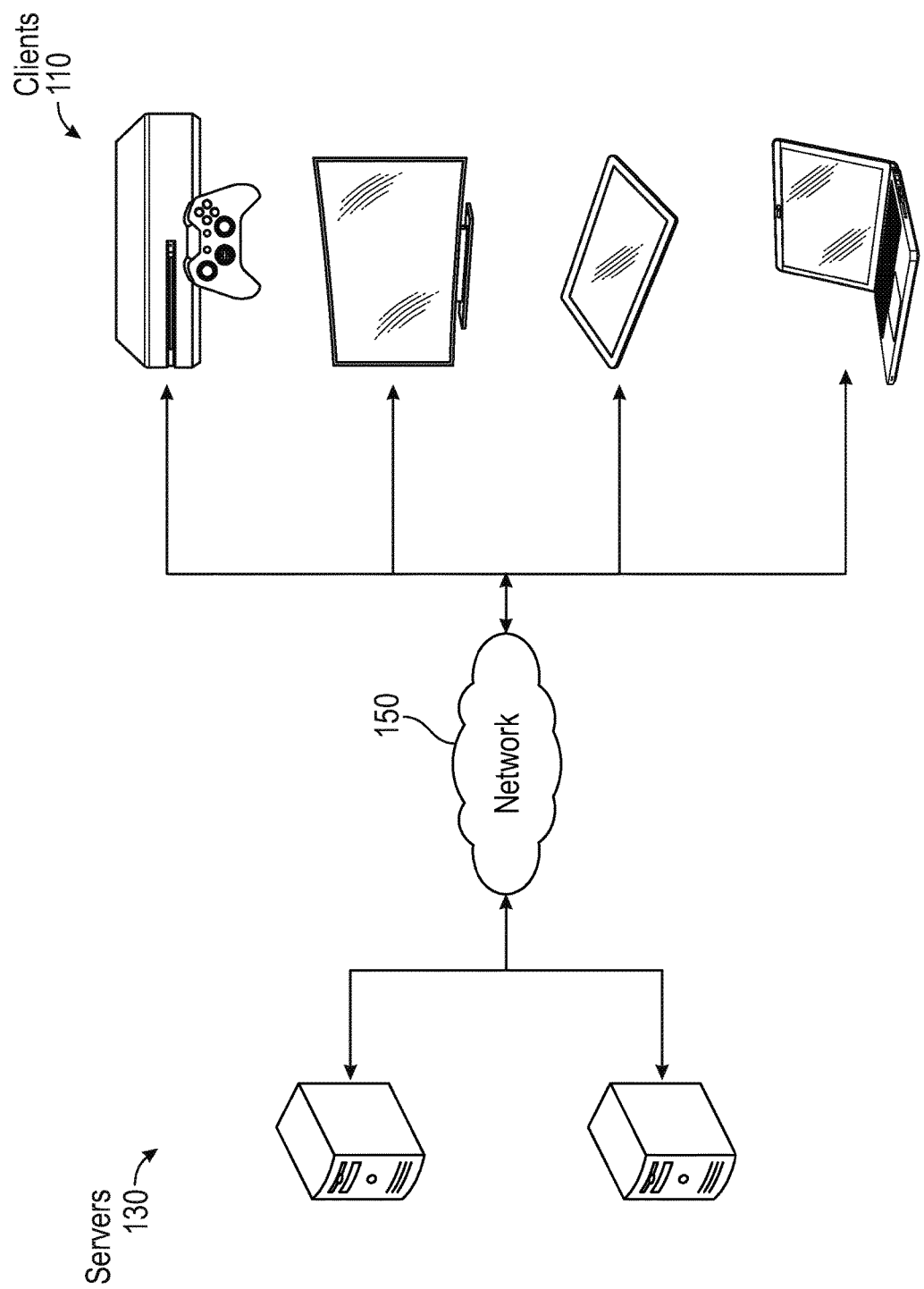
FIG. 1 illustrates an example architecture for distributed computing transactions through a proxy agent suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be used, for example, in reference to a digital file that is composed of one or more media elements of different types (text, image, metadata, video, audio, etc.). A content item can be a single picture or a single video file. The content item may include a representation of a digital trading card for use in a computer-operated multiplayer game (e.g., a computer-networked soccer game simulation), where the digital trading card may be a transferrable digital asset related to a certain subject (e.g., person, place or thing) and a description about the subject. The term "digital asset" may be used, for example, in reference to a computer-operated commodity, and may be used interchangeably with the term "content item" in some implementations. The term "online transaction repository" may refer to, for example, an electronic commerce exchange where content items such as trading cards are sold, purchased, auctioned, or exchanged for value between the proxy agent and one or more participant devices of the computer-operated multiplayer game. The term "proxy agent" may refer to an online auction house that is an intermediary element between distributed computing devices associated with the computer-operated multiplayer game (e.g., users participating in the computer-networked soccer game simulation). The proxy agent can facilitate and/or host distributed computing transactions such as electronic acquisition transactions involving the content items to and from the online transaction repository. The term "electronic acquisition transaction" may be used, for example, in reference to a sale transaction, a purchase transaction or an auction transaction with the online transaction repository. The term "electronic currency data" may be used, for example, in reference to a commodity that is composed of one or more types of computer-operated currencies (digital coins, points, etc.). The term "shard" may be used, for example, in reference to a database or data structure partition of data, where a shard is accessible independent of other shards in the database (or data structure).

General Overview

Online auction houses are generally available in many computer-operated multiplayer video games such as sports-themed video games (e.g., Ultimate Team sports and games). Users of the sports-themed video games compete in cooperation games or head-to-head matches with other users to earn points and/or digital trading cards. If a user opens a pack of digital trading cards and receives a number of cards that the user does not desire to keep, the user may visit an online auction house to transfer and/or exchange (e.g., list them for sale) the undesirable cards with other users of the video game. The other users can see the cards that the original user listed for sale, and can buy them from the original user. In this respect, the game (in conjunction with the online auction house) charges a percentage of the proceeds as a form of brokerage fee for the transaction, thereby representing a peer-to-peer marketplace for users to trade with one another. Traditional online auction houses face some great challenges. For example, as soon as users (e.g., human game players) can transfer content back-and-forth between themselves, the game becomes wrought with sellers (or "coin sellers") and users engaging in fraudulent activities. In some instances, these users run bots (e.g., supervised autonomous agents) that scour the electronic marketplace to buy all the cards that are listed by other users for a relatively low price point (e.g., below market data trends). In many instances, these bots are instructed to purchase these items at the near instant in time when the item is listed on the electronic marketplace. These bots are also instructed to re-list the purchased items for a relatively higher value from the relatively low purchase price point. These users gather electronic currency data (e.g., digital coins) over time in this manner, and eventually these users accumulate a significant amount of digital coins (e.g., millions or billions of digital coins) in an account associated with the game. This disproportionate accumulation of digital coins creates a secondary market that is outside of the electronic marketplace, where electronic currency such as these gathered digital coins are sold and purchased. This secondary market that enables the transfer of digital coins between consumers of the game (e.g., game players) circumvents the electronic marketplace to the detriment of the service provider of the game (e.g., the game publisher). In traditional electronic marketplaces, digital coins are not transferrable directly through the game or by the online auction house. In other instances, if the users want to buy a number of digital coins for consumption in the computer-operated multiplayer game, the users can purchase a million digital coins in exchange for government-issued currency units (e.g., twenty U.S. Dollars) using a third-party currency exchange platform, which is paid directly to an account on the currency exchange platform by the users. In this respect, the recipient of the government-issued currency completes the transaction by purchasing an objectively less-desirable digital trading card that is worth only 100 units (or 100 digital coins) from the user but is instead listed for sale for one million units (or one million digital coins) by the user. Essentially, the transfer of digital coins to the user from the original owner of the coins is processed through the electronic marketplace, although the pricing data for the sold digital trading card does not correctly map to the market data trends for that item. The transfer of one million digital coins, for example, directly into a recipient's account is at no cost to the purchasing user other than the currency that the purchasing user paid outside of the game (and electronic marketplace). This creates an indirect market to purchase digital coins by fraudulently listing items that are not consistent with the market pricing rates in exchange for currency outside of the electronic marketplace, and thereby enables the transfer of digital assets that is a significant detriment to the operation of computer-operated multiplayer games (e.g., ULTIMATE TEAM FIFA, WORLD OF WARCRAFT, DIABLO, etc.) and associated electronic marketplaces. This circumvention of the electronic marketplace and pricing manipulation creates a significant void in revenue for the game publishers, and poses a significant cost burden for game publishers to maintain a robust computer network security infrastructure and operation in an attempt to address the concerns created by users that trigger fraudulent activities using autonomous bots that run on networks tied to the electronic marketplaces.

The disclosed system addresses a problem in traditional multi-player game systems that associate gameplay with electronic marketplaces such as online auction houses, namely price manipulation of online transactions between distributed computing devices while circumventing the online marketplace for certain transactions essential to the transfer of digital assets. This is a problem specifically arising in the realm of computer technology. The problem is addressed by providing a solution also rooted in computer technology, namely, by considering the cessation of digital coin transmissions through fraudulent item listings while maintaining operations of an online auction house. The disclosed system represents an artificial intelligence based entity that acts as a middleman entity (or proxy agent) between all purchases with users so that when users obtain (or purchase) a digital trading card that the user does not want, that user can list that digital trading card for sale. In this respect, the middleman entity (or proxy agent) then would evaluate the pricing data of that digital trading card based on supply and demand data, purchase that digital trading card from a user, and then relist the purchased digital trading card for sale. Eventually, the proxy agent sells the listed digital trading card to other users (or game players) through an electronic acquisition transaction so that the content is continuously circulating through the game (and electronic marketplace) without the need to generate new content or destroy (or purge) content. With the proxy agent acting as a conduit between all purchase and sale transactions, a user may not be permitted to initiate a purchase or sale transaction directly with another user on the electronic marketplace, thus restricting any execution of transactions that are disproportionately mismatched with market-based pricing points. The proxy agent interaction with a purchasing user or selling user is transparent, and the user engagement in a free market of transferring digital assets with other users can be preserved.

The subject system provides several advantages including reducing the number of fraudulent item listings being generated on the electronic marketplace, maintaining all transactions (including purchases and sales) within the boundaries of the electronic marketplace, and maintaining a consistent mapping between marketplace pricing trends and pricing points of electronic acquisition transactions.

The disclosed system further provides improvements to the functioning of the computer itself because it saves data storage space, reduces system loading times and reduces the cost of system resources. Specifically, the proxy agent facilitates the savings in storage space by not requiring the generation of new content to keep the online marketplace operational because the existing content items are kept in circulation for different cycles of gameplay. The proxy agent facilitates the reduction of system loading times by storing shards, where each individual shard corresponds to a different collection of items with a different subset of users interacting with the shard-specific collection of items. The proxy agent facilitates the reduction in the cost of system resources by accessing a common repository of item metadata that indicates supply and demand metrics that is relevant to both sale and purchase transaction decisions by the proxy agent.

Although many examples provided herein describe a user's search inputs being identifiable (e.g., a user's transactional history identifying the user's interactions with content items from an auction house), or download history for content items being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

FIG. 1 illustrates an example architecture 100 suitable for practicing some implementations of the disclosure such as a proxy agent that hosts electronic exchanges between distributed computing devices. The architecture 100 includes servers 130 and clients 110 connected over a network 150. One of the many servers 130 is configured to host a computer-operated multiplayer game with access to an online transaction repository such as an electronic marketplace (not shown). The online transaction repository can be an online auction house that hosts item listings for transfer through direct purchase/sale transactions, auction transactions or exchange transactions, where items indicated in the item listings are marked with real-time pricing data and statistical information relating to professional sports players depicted as avatars and/or player agents in the items. One of the many servers 130 also hosts a collection of items. The collection of items can be searched using an online transaction repository engine (e.g., accessible through a multiplayer video game running on one of the clients 110). The servers 130 can return content items tagged with metadata indicating any prior purchase transactions and/or sale transactions involving one or more users of the computer-operated multiplayer game, which may be used to determine base price data for a given item. For purposes of load balancing, multiple servers 130 can host the neural network and multiple servers 130 can host the collection of images.

The servers 130 can be any device having an appropriate processor, memory, and communications capability of hosting access to the multiplayer video game and the electronic marketplace. The electronic transaction engine is accessible by various clients 110 over the network 150. The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities for accessing the online transaction repository engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

One of the many servers 130 is configured to host real-world data, such as real-world data corresponding to a sporting event (e.g., for use with digital trading cards). For purposes of load balancing, multiple servers 130 can host the real-world data. The server 130 may further be configured to host game simulations for multiple devices 110. For example, the server 130 may host a multiplayer game simulation to which multiple devices 110 connect, such that the multiple devices 110 experience the same simulation at approximately the same time.

The devices 110 include one or more computing devices. The devices 110 may include devices capable of running a simulation engine, such as a sports game, for simulating sporting events. For example, the devices 110 may include stationary video game consoles, tablets, mobile devices, laptop computers, desktop computers, and/or other devices capable of running a sports-themed video game.

Example Proxy Agent System for Distributed Computing Transactions

Figure 2:
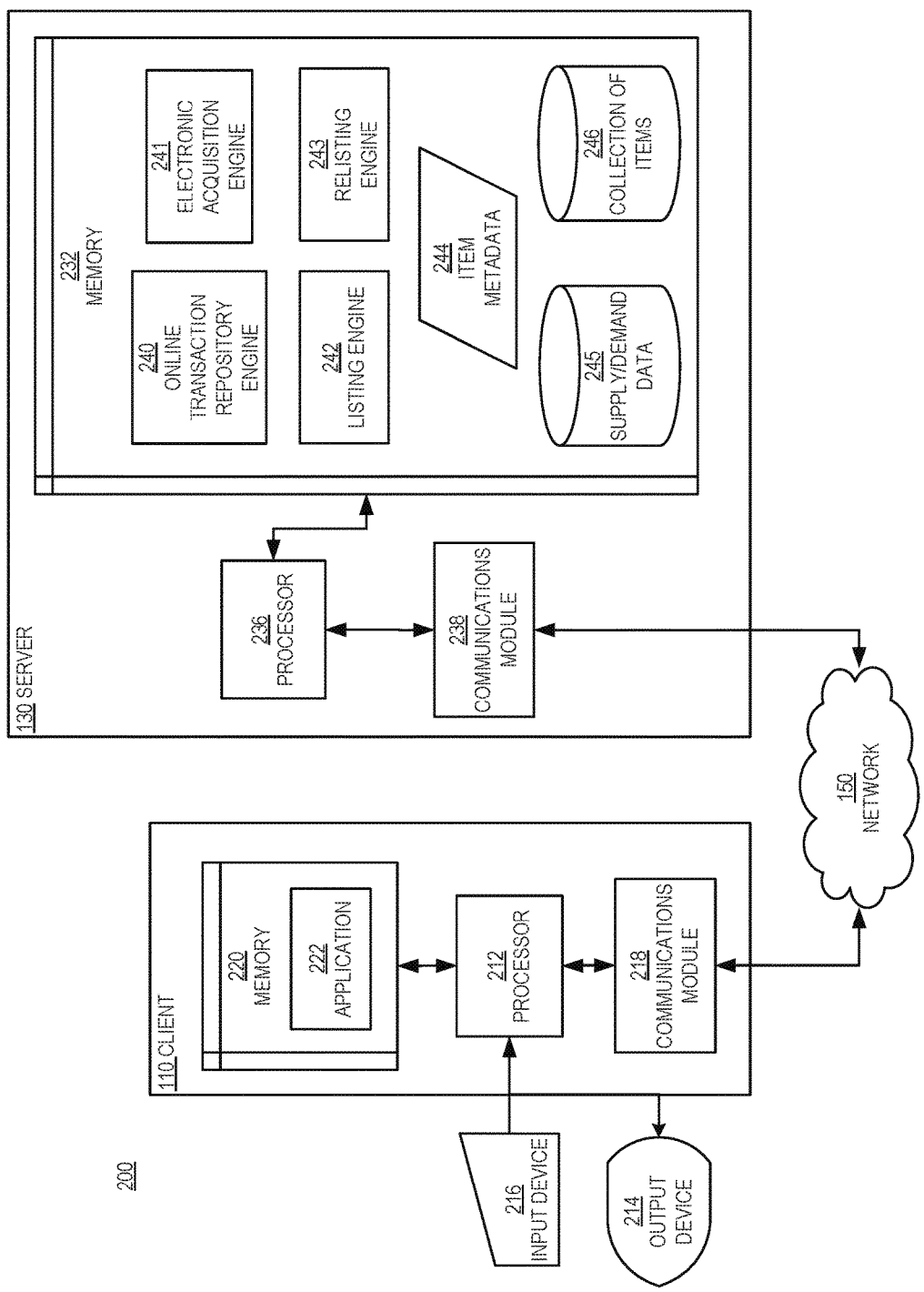
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes an online transaction repository engine 240, an electronic acquisition engine 241, a listing engine 242, and a relisting engine 243. The processor 236 of the server 130 is configured to execute instructions, such as instructions physically coded into the processor 236, instructions received from software in the memory 232, or a combination of both.

The online transaction repository engine 240 may be physically coded with instructions which, when executed, accesses an application programmable interface (API) of the online transaction repository where items can be exchanged between users through the server 130 acting as the proxy agent. The online transaction repository engine 240 may register events to listen for, which occur on the online transaction repository, and may execute one or more callback functions in response to the registered event. The callback functions may initiate a function associated with the purchase and/or sale of a content item such as a digital trading card of the multiplayer game.

The electronic acquisition engine 241 may be physically coded with instructions which, when executed, initiate a purchase transaction of a content item listed for sale by a user of the multiplayer game on the online transaction repository. The electronic acquisition engine 241 is configured to execute operations related to the purchase of content items from users based on one or more purchase transaction settings. The purchase transaction settings may be adjustable using one or more parameters (local or global) for each setting in an offline flow.

The listing engine 242 may be physically coded with instructions which, when executed, generate an item listing on the online transaction repository. The listing engine 242 is configured to execute operations related to the listing of content items on the online transaction repository to announce the item for sale to users based on one or more listing settings. The sale transaction settings may be adjustable using one or more parameters (local or global) for each setting in an offline flow.

The relisting engine 243 may be physically coded with instructions which, when executed, relist the item listing on the online transaction repository. The relisting engine 242 is configured to execute operations related to the relisting of content items on the online transaction repository to re-instantiate the announcement that the item is for sale to users based on one or more relisting settings. The relisting settings may be adjustable using one or more parameters (local or global) for each setting in an offline flow.

The memory 232 also includes item metadata 244. The item metadata 244 may include data relating to peer-to-peer transactions including historical transaction data obtained (or collected) through the proxy agent for a given item associated with the computer-operated multiplayer game. In one or more implementations, the item metadata 244 includes global and local parameters for use by the electronic acquisition engine 241, the listing engine 242 and the relisting engine 243.

In one or more implementations, the global and local parameters include a "purchaseEnabled" parameter signal that indicates whether the proxy agent can purchase items from users of the computer-operated multiplayer game. The global and local parameters may also include a "purchaseChanceEnabled" parameter signal that indicates whether the proxy agent does not potentially purchase an item if the asking price is in a different part of a predetermined price band when the proxy agent is determining whether to purchase an item from the user. The global and local parameters may also include a "useMarketDataInPurchaseDecision" parameter signal that indicates whether the proxy agent is set to use existing market data about an item in the determination of whether the proxy agent is to purchase an item. The global and local parameters may also include a "purchaseDistributionAlpha" parameter signal that indicates an Alpha value to be used in a Beta distribution used to determine the purchase price of an item. The global and local parameters may also include a "purchaseDistributionBeta" parameter signal that indicates an Beta value to be used in a Beta distribution used to determine the purchase price of an item.

In one or more implementations, the global and local parameters include a "startingBidPercent" parameter signal that indicates the percentage of the asking price (or listed price), for which the proxy agent lists the purchased item when the proxy agent has purchased the item. The global and local parameters may also include a "itemPriceJigglingEnabled" parameter signal that indicates whether the starting bid price is to be rounded to a nearest value (e.g., 10/100/1000) when the proxy agent purchases an item. The global and local parameters may also include a "minStartingBid" parameter signal that indicates what is the least (or minimum threshold) that the proxy agent can list an item for. The global and local parameters may also include a "buyNowPriceDistributionAlpha" parameter signal that indicates an Alpha value to be used in a Beta distribution used to determine the buy-now price of purchased items. The global and local parameters may also include a "buyNowPriceDistributionBeta" parameter signal that indicates an Beta value to be used in a Beta distribution used to determine the buy-now price of purchased items. The global and local parameters may also include a "startingBuyNowModifierEnabled" parameter signal that indicates whether the proxy agent is to use a weighted random value to determine the percentage of the base price of the buy-now price when the proxy agent purchases an item. The global and local parameters may also include a "bidOnExpiredItemsEnabled" that indicates whether the proxy agent is set to bid on expiring items or allow the item listings to expire. The global and local parameters may also include a "itemPriceJigglingRoundToNearest" parameter signal that indicates at what level the proxy agent rounds the starting bid of an item purchased by the proxy agent. The global and local parameters may also include a "startingBuyNowPercent" parameter signal that indicates the percentage of a base price for an item the proxy agent lists when the proxy agent purchases the item. In one or more implementations, the "startingBuyNowPercent" parameter signal may be overridden when the "buyNowModifierEnabled" parameter signal is set (or activated).

In one or more implementations, the global and local parameters include a "relistBuyNowPercent" parameter signal that indicates the percentage of a buy-now price the proxy agent relists for when the item listed by the proxy agent does not get sold within a prescribed time period. The global and local parameters may also include a "relistStartingBidPercent" parameter signal that indicates the percentage of a starting bid the proxy agent relists the item when the item listed by the proxy agent does not get sold. In one or more implementations, the "relistStartingBidPercent" parameter signal may be overridden when a "relistBidModifierEnabled" parameter signal is set (or activated). The global and local parameters may also include a "relistStartingBidModifierEnabled" parameter signal that indicates whether the proxy is set to select a value from a weighted random distribution to determine the percentage of the starting bid the proxy agent is to use to relist the item when an item listed by the proxy agent is not sold. The global and local parameters may also include a "relistBuyNowModifierEnabled" parameter signal that indicates whether the proxy is set to select a value from a weighted random distribution to determine the percentage of the buy-now price the proxy agent is to use to relist the item when an item listed by the proxy agent is not sold.

In one or more implementations, the global and local parameters include a "priceJigglingFormulaVersion" parameter signal that indicates the version of the price-jiggling formula the proxy agent utilizes. The global and local parameters may also include a "buyNowPriceFormulaVersion" parameter signal that indicates the version of the buy-now calculation formula the proxy agent utilizes. The global and local parameters may also include a "bidPurchaseFormulaVersion" parameter signal that indicates the version of the purchase-by-bid formula the proxy agent is to use.

Also included in the memory 232 of the server 130 is supply/demand data 245. The supply/demand data 245 may include historical transactional data that indicates a rate of transaction for a given item over a given time period. For example, the supply/demand 245 may indicate the demand for a given item based on how much time elapsed from a time the item was listed for sale to a time that the item was purchased, including how many units of that type of item have been sold within the given time period. The supply/demand data 245 also may indicate how many units of a given type of item have been purchased by the proxy agent, including how many units of the given type of item have been sold by the proxy agent. In one or more implementations, the supply/demand data 245 maintains respective historical transactional data for each given shard associated with the online transaction repository.

The memory 232 also includes a collection of items 246. The collection of items 246 may include one or more collections of digital trading cards for a given sport video game (or other multiplayer video games). In one or more implementations, each content item in the collection of items 246 may include an identifier that is unique to the proxy agent. In one or more implementations, the collection of items 246 includes an index to each digital trading card stored in the collection of items 246, where the index is addressable by an identifier of the content item, a corresponding shard or a given user account of the online transaction repository. The collection of items 246 may store a representation of the content item with a relatively lower resolution where a native version of the content item is stored on a repository accessible to the collection of items 246. Each content item in the collection of items 246 may include content that includes a graphical representation of a game character (e.g., portrait of professional soccer player depicted in the computer-operated multiplayer game) and statistical information about the game character (e.g., skill ratings, associated team, etc.). The content items, once purchased and/or sold, can be downloaded from the collection of items 246 to a participant device.

Although the supply/demand data 245 is illustrated as being separate from the item metadata 244, in certain aspects the supply/demand data 245 is a subset of the item metadata 244. Furthermore, although the collection of items 246 and the online transaction repository engine 240 are illustrated as being in the same memory 232 of the server 130, in certain aspects the collection of items 246 and the online transaction repository engine 242 can be hosted in a memory of a different server but accessible by the server 130 illustrated in FIG. 2.

The device 110 includes a processor 212, the communications module 218, and the memory 220 that includes the application 222. The application 222 may be a simulation engine, or physically coded instructions that execute a simulation of a sporting event, such as a sports-themed video game. The device 110 also includes an input device 216, such as a keyboard, mouse, touchscreen and/or game controller, and an output device 214, such as a display. The processor 212 of the device 110 is configured to execute instructions, such as instructions physically coded into the processor 212, instructions received from software in the memory 220, or a combination of both. The processor 212 of the device 110 executes instructions from the application 222 causing the processor 212 to run the sports-themed video game and provide access to an online transaction repository, where content items such as digital trading cards associated with the sports-themed video game can be purchased, sold, auctioned or exchanged with other participants in the sports-themed video game through the server 130.

In one or more implementations, using the online transaction repository engine 240, the processor 236 establishes a connection to an application programming interface (API) of the online transaction repository accessible to participant devices in a computer-operated multiplayer game. The online transaction repository may include the collection of items 246 associated with the computer-operated multiplayer game. The processor 236, using the online transaction repository engine 240, may determine that a transaction trigger event with respect to a first content item in the collection of items 246 has occurred. The transaction trigger event may indicate a first electronic acquisition transaction associated with the first content item by at least one of the participant devices. In one or more implementations, using the online transaction repository engine 240, the processor 236 determines that the transaction trigger event corresponds to an indication that the first content item has been marked for acquisition in the online transaction repository by one of the participant devices. In one or more implementations, using the online transaction repository engine 240, the processor 236 determines that the transaction trigger event corresponds to an indication that the first content item has been acquired from the online transaction repository by one of the plurality of participant devices.

In one or more implementations, using the electronic acquisition engine 241, the processor 236 determines, in response to the transaction trigger event, that a purchase control signal is enabled. The purchase control signal may indicate that automated electronic acquisitions from participant devices are permitted. In one or more implementations, using the electronic acquisition engine 241, the processor 236 determines, in response to the enabled purchase control signal, that information about the first content item is stored in metadata (e.g., item metadata 244) associated with the online transaction repository. In one or more implementations, using the electronic acquisition engine 241, the processor 236 processes electronic acquisition transaction historical data associated with the online transaction repository for analysis. Using the electronic acquisition engine 241, the processor 236 may thereafter identify the first content item from an index in the metadata, where the index contains the information about the first content item.

Using the electronic acquisition engine 241, the processor 236 determines a base price parameter for a second electronic acquisition transaction based on a weighted distribution of content items associated with the computer-operated multiplayer game of a same type as that of the first content item from the metadata. Using the electronic acquisition engine 241, the processor 236 adjusts the base price parameter by a factor of a value of the price modifier parameter to calculate the maximum price parameter.

Using the electronic acquisition engine 241, the processor 236 determines a weight value of each of the content items from the weighted distribution, where the weight value may indicate a level of rarity of the content item in the online transaction repository. Using the electronic acquisition engine 241, the processor 236 also calculates the base price parameter from a logarithmic equation as a function of the determined weight values.

Using the electronic acquisition engine 241, the processor 236 determines a price modifier parameter for the second electronic acquisition transaction based on a number of content items of the same type as that of the first content item available for acquisition for the computer-operated multiplayer game. Using the electronic acquisition engine 241, the processor 236 adjusts the number of content items by decreasing the number by a factor of a first predetermined value. Using the electronic acquisition engine 241, the processor 236 also sums the adjusted number of content items with a second predetermined value to calculate the price modifier parameter.

Using the electronic acquisition engine 241, the processor 236 determines a maximum price parameter for the second electronic acquisition transaction based on the base price parameter and the price modifier parameter. Using the electronic acquisition engine 241, the processor 236 determines a first item listing indicating a second content item marked for acquisition in the online transaction repository. The second content item may have been marked by a first participant device of the participant devices. Using the electronic acquisition engine 241, the processor 236 determines that the second content item includes a current bid price parameter and a buy now price parameter. Using the electronic acquisition engine 241, the processor 236 also determines that a value of the buy now price parameter does not exceed a value of the maximum price parameter, where the second content item is obtained based on the buy now price parameter.

Using the electronic acquisition engine 241, the processor 236 determines whether a counter associated with the first item listing has exceeded a prescribed time period. Using the electronic acquisition engine 241, the processor 236 obtains the second content item from the online transaction repository using the second electronic acquisition transaction when the counter has not exceeded the prescribed time period.

In one or more implementations, using the listing engine 242, the processor 236 generates a second item listing of the second content item. The second item listing may mark the second content item available for acquisition by participant devices other than the first participant device. The second item listing may be generated by determining a first listing bid price parameter for the second content item, determining whether a buy now price modifier control signal is enabled, determining a first listing buy now price parameter for the second content item when the buy now price modifier control signal is not enabled, and determining a first listing duration parameter from a weighted random distribution. Using the listing engine 242, the processor 236 provides the second item listing for transmission to the API of the online transaction repository.

Using the electronic acquisition engine 241, the processor 236 determines that the counter has exceeded the prescribed time period. Using the electronic acquisition engine 241, the processor 236 also determines whether the purchase control signal is enabled when the counter exceeded the prescribed time period. Using the electronic acquisition engine 241, the processor 236 also determines a current bid price parameter of the first item listing when the purchase control signal is enabled. Using the electronic acquisition engine 241, the processor 236 also determines whether a first bid price value of the current bid price parameter exceeds a value of the maximum price parameter. Using the electronic acquisition engine 241, the processor 236 also determines a second bid price value for the current bid price parameter when the first bid price value does not exceed the value of the maximum price parameter. The second bid price value may be in a range of the first bid price value and the value of the maximum price parameter, where the second bid price value is determined using one or more values from a beta distribution. The second bid price value may be determined by decreasing the value of the maximum price parameter by the first bid price value to determine a first number, adjusting the first number by a factor of a value from the beta distribution to determine a second number, and summing the first bid price value with the second number to calculate the second bid price value. Using the electronic acquisition engine 241, the processor 236 also provides, for transmission, an electronic acquisition request to the online transaction repository, where the electronic acquisition request may indicate a bid to acquire the second content item at the second bid price value. Using the electronic acquisition engine 241, the processor 236 also receives indication that the bid to acquire the second content item at the second bid price value has been accepted. Using the electronic acquisition engine 241, the processor 236 also obtains, in response to the received indication, the second content item from the online transaction repository. In one or more implementations, the first item listing may be permitted to expire when the purchase control signal is not enabled or the first bid price value exceeds the value of the maximum price parameter.

Using the listing engine 242, the processor 236 determines that the buy now price modifier control signal is enabled. Using the listing engine 242, the processor 236 also determines a buy now price modifier parameter from a weighted random distribution, in which the first listing buy now price parameter is based on the buy now price modifier parameter. Using the listing engine 242, the processor 236 determines that a price rounding parameter is enabled. Using the listing engine 242, the processor 236 also adjusts one or more of the first listing bid price parameter or the first listing buy now price parameter by rounding to a nearest integer when the price rounding parameter is enabled.

Using the listing engine 242, the processor 236 determines that the second content item was not electronically acquired through the second item listing. Using the relisting engine 243, the processor 236 determines a relist bid modifier parameter. Using the relisting engine 243, the processor 236 also determines a second listing bid price parameter different from the first listing bid price parameter for the second item listing based on the relist bid modifier parameter, where the second listing bid price parameter may be a product of the first listing bid price parameter and the relist bid modifier parameter. Using the relisting engine 243, the processor 236 also determines a relist buy now modifier parameter. Using the relisting engine 243, the processor 236 also determines a second listing buy now price parameter for the second item listing based on the relist buy now modifier parameter, where the second listing buy now price parameter may be a product of the first listing buy now price parameter and the relist buy now modifier parameter. Using the relisting engine 243, the processor 236 also determines a second listing duration parameter from the weighted random distribution for the second item listing. Using the relisting engine 243, the processor 236 also adjusts the second item listing using the second listing bid price, the second listing buy now price and the second listing duration parameter. Using the relisting engine 243, the processor 236 also provides, for transmission, the adjusted second item listing to the API of the online transaction repository.

Figure 3:
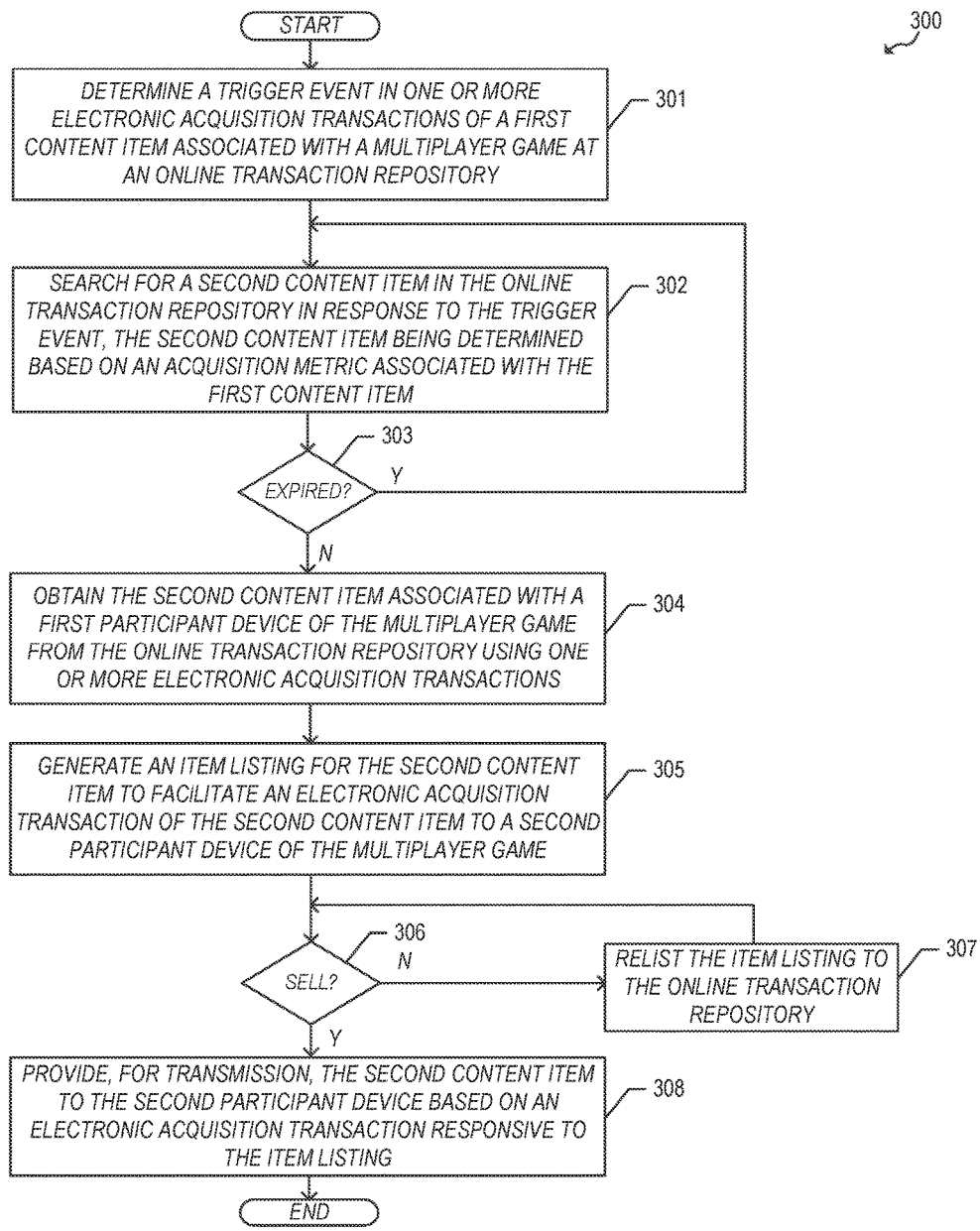
FIG. 3 illustrates an example process of facilitating electronic exchange transactions between distributed computing devices through a proxy agent using the example server of FIG. 2.

FIG. 3 illustrates an example process 300 of facilitating electronic exchange transactions between distributed computing devices through a proxy agent using the example server of FIG. 2. While FIG. 3 is described with reference to FIG. 2, it should be noted that the process steps of FIG. 3 may be performed by other systems.

The process 300 begins by proceeding from start step to step 301 where the processor 236, using the online transaction repository engine 240, determines a trigger event in one or more electronic acquisition transactions of a first content item associated with a multiplayer game at an online transaction repository. For example, the server 130, acting as the proxy agent, monitors activity involving a particular soccer-themed digital trading card, and determines that either a purchase or sale transaction of the soccer-themed digital trading card occurred. The trigger event may be indicative of a need to analyze whether there is an increase in supply or demand for that particular soccer-themed digital trading card. In some implementations, inventory data accessible to the proxy agent via the processor 236 may indicate supply of the particular soccer-themed digital trading card is running below a predetermined supply threshold value and, therefore, the proxy agent transitions into a state to search for additional units of the particular soccer-themed digital trading card for purchase through an electronic acquisition transaction with the online transaction repository.

Subsequently, in step 302, using the online transaction repository engine 240, the processor 236 searches for a second content item in the online transaction repository in response to the trigger event. In one or more implementations, the second content item is determined based on an acquisition metric associated with the first content item. For example, the server 130, using the processor 236 and the electronic acquisition engine 241, determines the acquisition metric from the supply/demand data 245, which may indicate that a number of units of the first content item (e.g., the particular soccer-themed digital trading card) hosted in the collection of items 246 is indeed below the predetermined threshold value.

Next, in step 303, the processor 236 finds the second content item and determines whether an item listing for the found second content item has expired. The second content item may be listed by a first participant device of the multiplayer game and, therefore, associated with the first participant device. If the item listing has expired, then the process 300 proceeds back to step 302 to initiate a new search for an item listing with a content item similar to the first content item. Otherwise, the process 300 proceeds to step 304.

In step 304, the processor 236, using the electronic acquisition engine 241, obtains the second content item from the online transaction repository using one or more electronic acquisition transactions. For example, the server 130, as the proxy agent, can search for and purchase the particular soccer-themed digital trading card listed on the online transaction repository by a user of the soccer-themed game simulation. In some implementations, the server 130, as the proxy agent, acquires the soccer-themed digital trading card in exchange for a number of digital coins as a form of electronic currency used in the soccer-themed game simulation.

Subsequently, in step 305, the processor 236, using the listing engine 242, generates an item listing for the second content item to offer the second content item for acquisition by a second participant device of the multiplayer game. The item listing may include a representation of the second content item with information on how to acquire the second content item from the online transaction repository. The information may indicate real-time pricing data at a time that a participant device accesses the item listing (e.g., a user viewing the item listing with a current bid price), pricing parameters set by the owner of the item listing (e.g., buy now price, minimum bid price), and statistical information about a player agent or avatar depicted in the second content item (e.g., game statistics for a professional soccer player being simulated in the soccer-themed game simulation).

Next, in step 306, the processor 236 determines whether the item listing for the second content item has sold (or has been electronically acquired). If the item listing has not sold, then the process 300 proceeds to step 307 to relist the item listing to the online transaction repository for at least another opportunity to sell the item. Otherwise, the process 300 proceeds to step 308.

In step 308, using the communications module 238, the processor 236 provides, for transmission, the second content item to the second participant device based on an electronic acquisition transaction triggered in response to the item listing. For example, a user of the second participant device may select to purchase the second content item listed by the proxy agent, and the proxy agent may transmit the second content item over a download transmission to the second participant device. In one or more implementations, the second content item is provided to the second participant device in exchange for electronic currency from the second participant device.

Figure 4A:
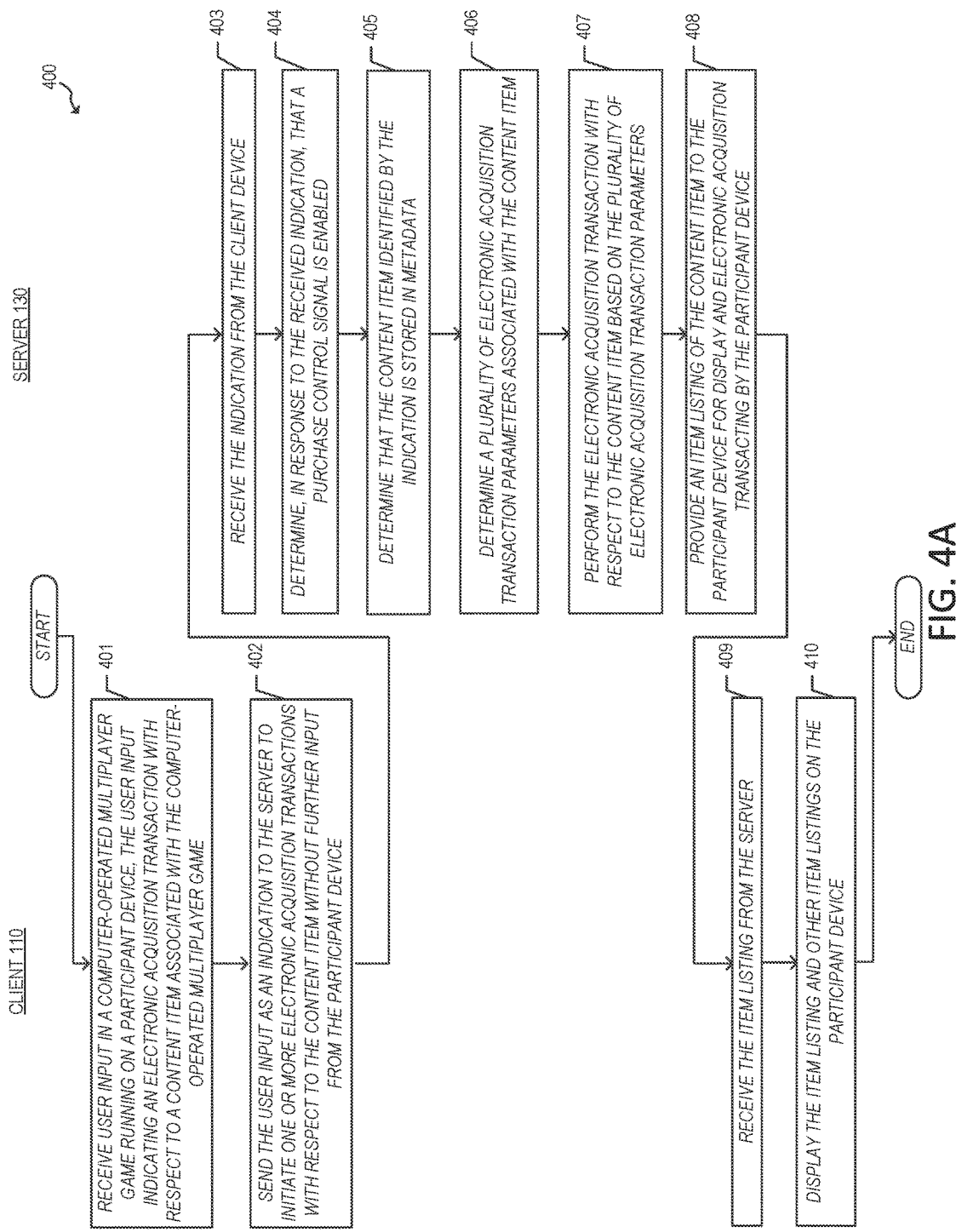
FIG. 4A illustrates an example process of facilitating electronic exchange transactions between distributed computing devices through a proxy agent using the example client and server of FIG. 2.

FIG. 4A illustrates an example process 400 of facilitating electronic exchange transactions between distributed computing devices through a proxy agent using the example client and server of FIG. 2. The process 400 begins in step 401 when a user, for example, loads an application 222 on a client 110 such as a computer-operated multiplayer game running on the client 110, and the client 110 receives an input from the user in using the input device 216. In some implementations, the input indicates an electronic acquisition transaction with respect to a content item associated with the computer-operated multiplayer game.

The input may indicate an intent to sell the content item on the online transaction repository or an intent to purchase the content item from the online transaction repository. In one or more implementations, the input includes instructions to initiate an electronic acquisition transaction by purchasing the content item from or selling the content item to the online transaction repository. The input may include one or more parameters that set a baseline price and/or maximum price parameter for the electronic acquisition transaction.

This list of parameters of the input is not exhaustive and may include other parameters for the electronic acquisition transaction.

Next, in step 402, the application 222 on the client 110 sends the input as an indication to the server 130 in order to initiate one or more electronic acquisition transactions with respect to the content item without further input from the client 110. In step 403, the server 130 receives the indication from the client 110. Subsequently, in step 404, the server 130 determines, in response to the received indication, that a purchase control signal is enabled.

Next, in step 405, the server 130 determines that the content item identified by the indication is stored in metadata. Subsequently, in step 406, the server 130 determines a plurality of electronic acquisition transaction parameters associated with the content item. Next, in step 407, the server 130 performs the electronic acquisition transaction with response to the content item based on the plurality of electronic acquisition transaction parameters.

In step 408, the server 130 provides an item listing of the content item to the client 110 for display and electronic acquisition transacting by the client 110. In step 409, the client 110 receives the item listing from the server 130. Next, in step 410, the received item listing and other item listings are provided for display via the application 222 of the client 110.

Figure 4B:
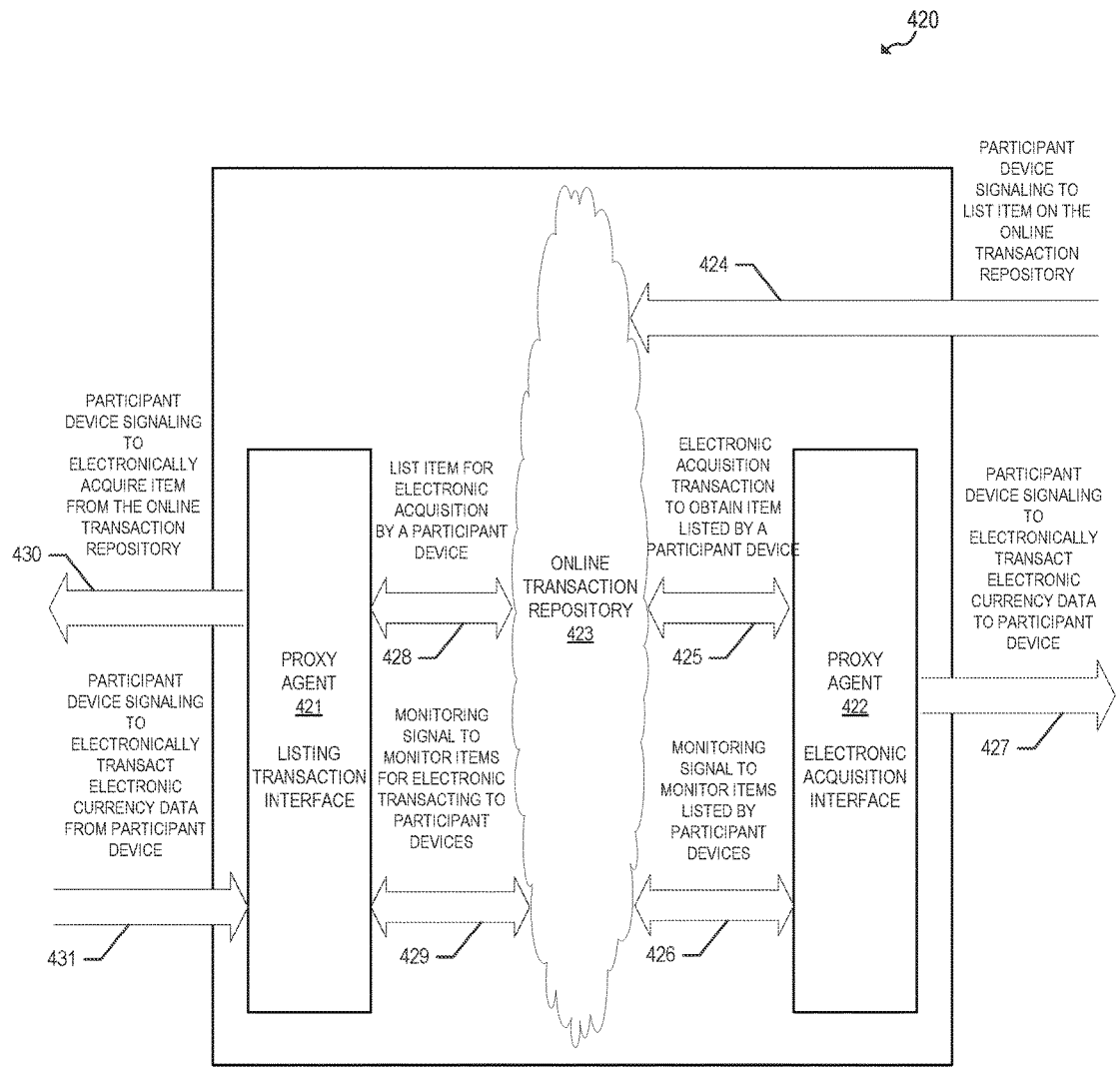
FIG. 4B illustrates a schematic diagram of an example interface between a proxy agent for distributed computing transactions and an online transaction repository.

FIG. 4B illustrates a schematic diagram 420 of an example interface between a proxy agent (e.g., 421, 422) for distributed computing transactions and an online transaction repository 423. The proxy agent 421 is configured to handle items listed for sale by the proxy agent 421, and the proxy agent 422 is configured to handle purchases made from users by the proxy agent 422. In operation, a participant device of the multiplayer game provides signaling (e.g., 424) to list an item on the online transaction repository 423. Rather than having the participant device sell the item directly to another participant device where the transaction may be susceptible to price manipulation and other fraudulent type activities, the proxy agent 422 acts as a buying party and purchases the item listed for sale by the participant device. In this respect, the proxy agent 422 may first monitor the online transaction repository 423 for items listed by participant devices using a monitoring signal (e.g., 426). The proxy agent 422 thereafter initiates an electronic acquisition transaction with the participant device through the online transaction repository 423 to obtain the item listed by the participant device (e.g., 425). In exchange for the item, the proxy agent 422 provides participant device signaling to electronically transact electronic currency data to the participant device (e.g., 427). For example, the proxy agent 422 may compensate the user with an agreed upon amount of digital coins in exchange for the digital trading card listed for sale on the online transaction repository 423.

In one or more implementations, the proxy agent 421 lists the purchased item for electronic acquisition by a participant device (e.g., 428). A participant device may provide participant device signaling to electronically acquire the item from the online transaction repository 423 (e.g., 430). The participant device either simultaneously or in a subsequent transaction provides participant device signaling to electrically transact electronic currency data to the proxy agent 421 in exchange for the item purchased by the participant device (e.g., 431). In one more implementations, the proxy agent 421 provides a monitoring signal to the online transaction repository 423 to monitor items for electronic transacting to participant devices (e.g., 429).

Figure 4C:
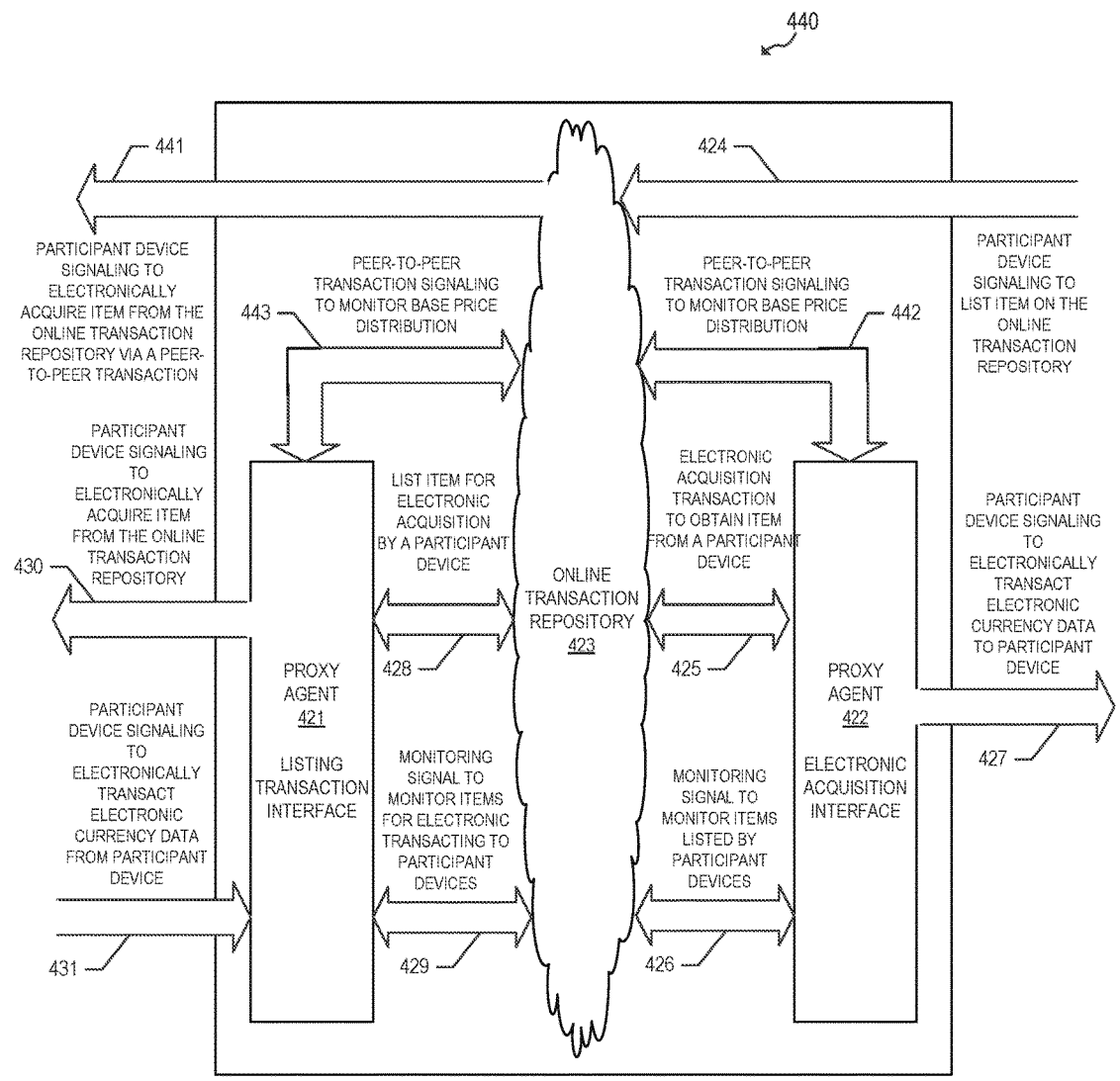
FIG. 4C illustrates a schematic diagram of an example interface between a proxy agent for distributed computing transactions and peer-to-peer transactions.

FIG. 4C illustrates a schematic diagram 440 of an example interface between a proxy agent for distributed computing transactions and peer-to-peer transactions. FIG. 4C is substantially similar to FIG. 4B and, therefore, only differences from FIG. 4B will be discussed in reference to FIG. 4C. In operation, a participant device of the multiplayer game provides signaling (e.g., 424) to list an item on the online transaction repository 423. In a peer-to-peer transaction, another participant device accesses the online transaction repository 423 and provides participant device signaling to electronically acquire an item from the online transaction repository 423. In one or more implementations, the proxy agent 421 monitors the peer-to-peer sale transactions for data indicating a base price distribution. In one or more implementations, the proxy agent 422 also monitors the peer-to-peer purchase transactions for additional data indicating the base price distribution. The proxy agent (e.g., 421, 422) monitors the base price distribution when pricing data for a given item is not sufficient and/or the given item is a rare item (e.g., 442, 443) for use in listing transactions (e.g., 428) and purchase transactions (e.g., 425).

In traditional online auctions, there are two ends of a deal, party A who places an item for sale and party B who buys that item from party A. As discussed above, party A and party B may collude outside of the multiplayer interactive environment and sell an item that was of very little value for very high amounts of monetary value, which serves for transfer of money and fraudulent activity within the interactive environment. To mitigate this problem, a proxy C is interjected such that proxy C acquires an item listed by party A and then subsequently lists that same item for sale to party B. In this respect, party A and party B do not have a direct transaction with each other. Now, a certain set of questions arise such as what are the set of prices that the proxy C should acquire an item at, and at what price should the proxy C list for sale to party B. This is more prevalent when the item does not exist in inventory of the online auction house. For external events that occur outside of the electronic marketplaces, the data available to the traditional online auction houses may not be sufficient to represent the actual demand in the marketplace or for some rare items that do not trigger sufficient interaction data.

The interactive environment may have multiple options on which platform to conduct transactions. In one or more implementations, users are assigned to each shard (e.g., shard 1, shard 2, and shard 3) based on a predetermined classification in some embodiments, or based on a randomized classification in other embodiments. For example, for users that are assigned to conduct transactions within shard 1, can only see the other users also assigned to shard 1. In this respect, there is limited interactivity between shard 1 and shard 2 (e.g., number of inter-shard transactions). In one or more implementations, the proxy agent associates one of these shards to the traditional way of interaction between users (i.e., person-to-person transactions). In this respect, the shard that has access to the person-to-person transactions can enable the proxy agent to determine an approximate base line of the acquisition values (e.g., base price values) that are of interest to users.

If there is a new item that was never in the interactive environment and the proxy agent does not have a metric indicating a level of popularity for that new item, then the proxy agent may release that new item (i.e., provide an item listing) to a particular shard to gather user interaction data (e.g., user feedback) from the peer-to-peer transactions and measure the amount of demand for that new item using values dictated by users. Once the proxy agent has the base value for that type of item, the proxy agent can replicate and/or distribute the base value to the other shards (e.g., shard 2 and shard 3), where the item listing values are controlled by the proxy agent. The proxy agent may vary from the values being used in the shard associated with the peer-to-peer transactions (e.g., prices listed in shard 1). For mitigating the problem of transactions occurring outside of the electronic marketplace, the proxy agent can randomize the shard assignments over time, such as determining which shards would be user-controlled and which shards would be controlled by the proxy agent. In this respect, users originally assigned to a shard where peer-to-peer transactions take place and are attempting to execute fraudulent transactions, may be reassigned to a different shard at times where the proxy agent manages and controls the acquisition and sale transactions across the electronic marketplace for that shard, thereby reducing the likelihood of users completing any transactions on the online marketplace that are contingent on an external transaction.

Using the electronic acquisition transaction engine 240, the processor 236 initiates a connection to an application programming interface (API) of an online transaction repository accessible to a plurality of participant devices in a computer-operated multiplayer game, in which the online transaction repository includes a collection of items associated with the computer-operated multiplayer game, and where the connection is initiated by a proxy agent including a plurality of shards.

Using the electronic acquisition transaction engine 240, the processor 236 associates a first shard of the plurality of shards to a peer-to-peer transaction channel to the online transaction repository, in which at least two of the plurality of participant devices interact with one another over the peer-to-peer transaction channel, and determines which of the plurality of shards to associate with the peer-to-peer transaction channel based on a random distribution. The random distribution may indicate a random selection of one of the plurality of shards for different times.

Using the electronic acquisition transaction engine 240, the processor 236 determines a first item from the collection of items having a transactional history that does not exceed a threshold number of transactions. The first item may be associated with a first item listing accessible exclusive to the first shard. In this respect, other shards of the plurality of shards do not have access to the peer-to-peer transaction channel when the first shard is associated with the peer-to-peer transaction channel. In one or more implementations, more than one shard is associated with the peer-to-peer transaction channel to gather value information for different items and/or from different classification of users. Using the electronic acquisition transaction engine 240, the processor 236 provides the first item to the peer-to-peer transaction channel via the first shard, and then monitors the first item for any activity.

Using the electronic acquisition transaction engine 240, the processor 236 determines that a trigger event associated with the first item occurred on the peer-to-peer transaction channel, and determines whether an item listing for the first item either resulted in a sale transaction or the item listing expired.

Using the electronic acquisition transaction engine 240, the processor 236 determines that the first item exists in metadata of the online transaction repository, and determines a number of electronic acquisition transactions for the first item over a specified period of time. Using the electronic acquisition transaction engine 240, the processor 236 also determines that the number of electronic acquisition transactions does not exceed the threshold number of transactions. For example, the first item may be a new item where there is not enough information about its pricing to set a definitive value for that item, or the item does not garner enough traffic to determine the actual amount of demand for that item.

Using the electronic acquisition transaction engine 240, the processor 236 obtains pricing data associated with the trigger event from the peer-to-peer transaction channel. In one or more implementations, the pricing data includes a start price value, an end price value or a listing duration value for the first item. The listing duration value may indicate a length of time from when the first item listing was generated to a time when the first item was acquired by an electronic transaction responsive to the first item listing. In one or more implementations, the pricing data indicates a number of interactions between participant devices of the plurality of participant devices with respect to the first item over a specified period of time. For example, the pricing data may indicate the amount of demand for that item within a given time period.

Using the electronic acquisition transaction engine 240, the processor 236 generates a weighted distribution of the obtained pricing data, and determines a base price value for the first item from the weighted distribution. In one or more implementations, the base price value is based on an acquisition metric of the first item from the weighted distribution. The acquisition metric may indicate a relationship between the number of interactions and a corresponding base price value. For example, the value of the item may increase when the number of interactions increases, thereby indicating an increase in demand for that item.

Using the electronic acquisition transaction engine 240, the processor 236 determines a weight value for each base price pairing in the weighted distribution. In one or more implementations, the base price pairing indicates a relationship between a given price point and a corresponding listing duration for the first item. The listing duration may indicate how much time elapsed for the first item to sell in some implementations, or how much time elapsed before expiring in other implementations. The weight value may indicate a number of interactions with the first item in the online transaction repository at the given price point. Using the electronic acquisition transaction engine 240, the processor 236 also calculates the base price value from a logarithmic equation as a function of the determined weight values.

Using the electronic acquisition transaction engine 240, the processor 236 determines whether to initiate a sale transaction or an acquisition transaction with the online transaction repository, and determines when to acquire a specified item using one or more base price values from the weighted distribution when it is determined to initiate the acquisition transaction. Using the electronic acquisition transaction engine 240, the processor 236 also determines when to generate an item listing for the specified item using the one or more base price values from the weighted distribution when it is determined to initiate the sale transaction. For example, the values from the weighted distribution may be indicative of when to acquire an item, when to sell an item, and how to set the value for the item.

Using the electronic acquisition transaction engine 240, the processor 236 applies the base price value to a second item of a same type as that of the first item for an electronic acquisition transaction with the online transaction repository by the proxy agent. In one or more implementations, the second item is associated with a second item listing accessible exclusive to a second shard of the plurality of shards.

Using the electronic acquisition transaction engine 240, the processor 236 adjusts one or more parameters of the second item listing based on the base price value determined from the weighted distribution. For example, the one or more parameters may include local parameters and/or global parameters for adjusting a prior value for an item listing to a new value.

Using the electronic acquisition transaction engine 240, the processor 236 disassociates the first shard from the peer-to-peer transaction channel, and associates the second shard to the peer-to-peer transaction channel based on the random distribution. Using the electronic acquisition transaction engine 240, the processor 236 also obtains additional pricing data from the peer-to-peer transaction channel via the second shard. For example, the proxy agent can randomly reassign the shards to the peer-to-peer transaction channel to mitigate any fraudulent activities that occur outside of the electronic marketplace (or the peer-to-peer transaction channel) from influencing the values set through the peer-to-peer transactions.

Figure 5A:
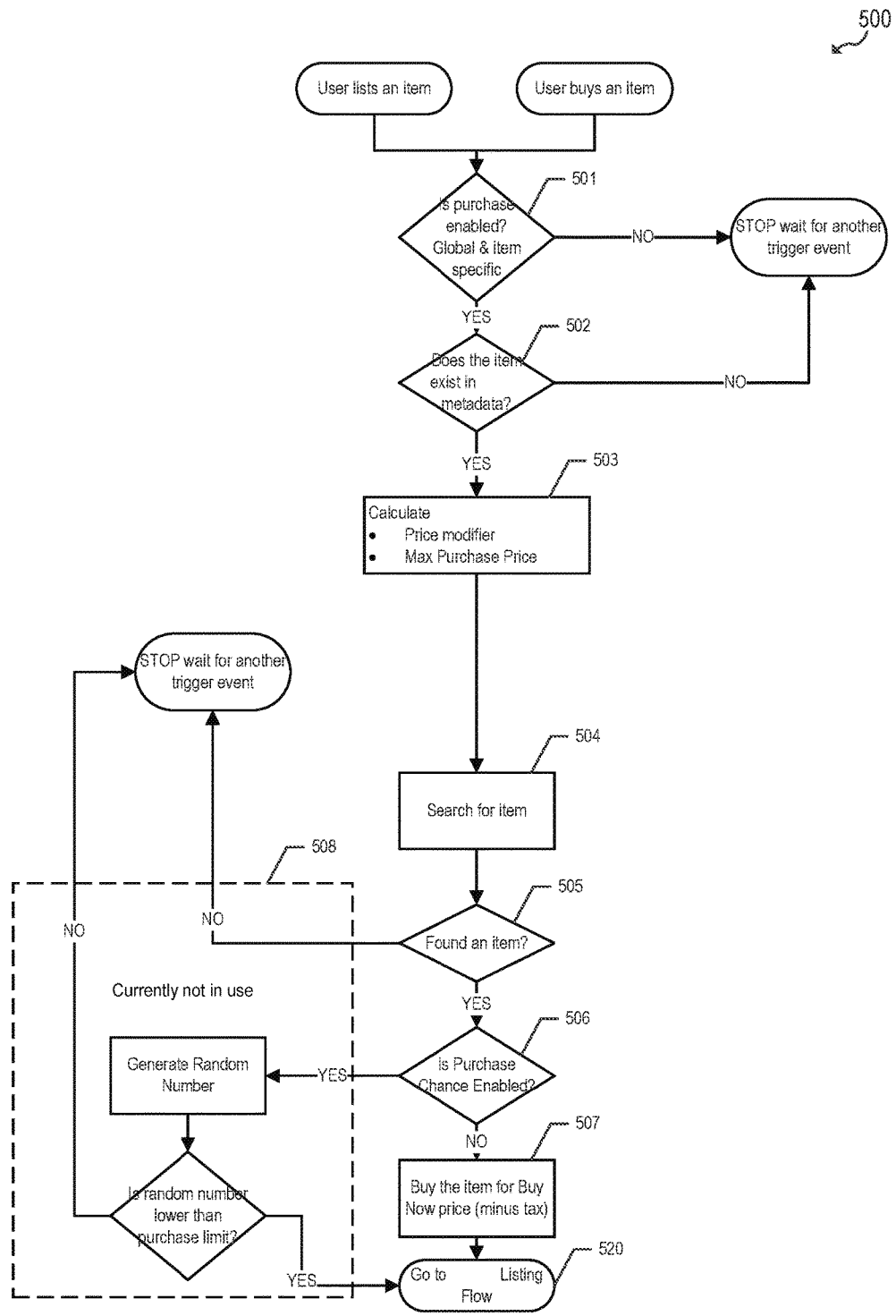
FIG. 5A illustrates an example process of an electronic acquisition transaction to acquire a content item on an online transaction repository using the example server of FIG. 2.

FIG. 5A illustrates an example process 500 of an electronic acquisition transaction to acquire a content item on an online transaction repository using the example server of FIG. 2. While FIG. 5A is described with reference to FIG. 2, it should be noted that the process steps of FIG. 5A may be performed by other systems.

The process 500 begins from the occurrence of a trigger event to step 501 where the processor 236, using the online transaction repository engine 240, determines whether the proxy agent (e.g., server 130) is set with a parameter signaling indicating that purchase control is enabled globally (i.e., for all items) or is item specific. If the purchase control is not enabled, then the process 500 proceeds to a state where the proxy agent can wait for another trigger event. In one or more implementations, the trigger event includes an event where a user has listed an item for sale or an event where a user has purchased an item. If the purchase control is enabled, then process 500 proceeds to step 502.

In one or more implementations, there are two triggers in the interactive environment, where the proxy agent initiates a determination on whether or not it wants to look up an item and acquire the item. For example, an item that depicts a popular subject, such as a popular professional soccer player (e.g., LIONEL MESSI), on the auction house may be dormant, and the whole market system does not interact with that item until one of these triggers occurs. As noted, one of the triggers is when the user lists an item and the other trigger is when the user acquires that item. Whenever there is a change in inventory of a single item, the disclosed system, such as the proxy agent, is initiated and determines whether the proxy agent is set to act on that item in response to the trigger event. The proxy agent first looks at what is the current associated inventory of items. This operation may serve as a "kill switch" in the interactive environment for items in order to turn items off (i.e., disable item listings) if the item necessitates to be turned off. The proxy agent then determines whether the item is available for acquisition. If the item is available for acquisition (or the proxy agent is permitted to acquire the item), then the item is added to the flow. If it is not, then the proxy agent ignores the item.

In step 502, using the online transaction repository engine 240, the processor 236 determines whether the item identified from the trigger event exists in metadata of the online transaction repository in some embodiments, or in metadata associated with the proxy agent in other embodiments. If the item metadata does exist, then the process 500 proceeds to step 503. Otherwise, the process 500 proceeds back to the wait state for another trigger event. The second piece is more of a security piece, where the proxy agent determines whether the item exists in the metadata associated with the proxy agent. The metadata may be where all content and information for that content coexists. This may be used to prevent buyers from manipulating control of the proxy agent into looking at fake (or fraudulent) items or items that do not exist.

In step 503, using the electronic acquisition engine 241, the processor 236 calculates a price modifier value and a maximum purchase price value. The maximum purchase price value may be determined using the price modifier value and a base price for the item. The base price may be determined from a weighted distribution where the base price value may correspond to pricing data from a prior peer-to-peer transaction for that type of item (see FIG. 4C).

Once the proxy agent verifies the first two pieces of the flow, and the proxy agent can confirm that the item is enabled for acquisition and the item is indeed a real item, the proxy agent then runs through a calculation to determine the price modifier. The price modifier may be the calculation that the proxy agent uses to determine the value of that item at any given time, and that value is based on the number of items that the proxy agent owns at that time. In this respect, if a user lists the MESSI item, the proxy agent first determines how many items of this type does the proxy agent already have. Based on that determination, the proxy agent can determine a starting price (or base price). For example, the proxy agent determines that it owns 5 MESSI items, so the proxy agent then determines that its value should be X.

In some aspects, the interactive environment may run a promotion that provides a relatively high probability of a MESSI item being circulated in a pack of trading cards, such that a large population on the online marketplace (e.g., participant devices interacting with the electronic transaction repository) begin listing the MESSI item for sale. If the MESSI item has a flat price, the proxy agent may experience a spike in transactions because users would be acquiring the MESSI items at a relatively high rate. The proxy agent may determine it does not own a single one version of the MESSI item, then the proxy agent may conclude that the MESSI item is a very valuable (or popular) item because no user can acquire a single version of the MESSI item from the proxy agent. The proxy agent may determine that if it acquires the item with the known demand rate, the proxy agent determines that it can potentially sell that item for a relatively high value because of its rarity. However, when the number of item listings generated by the proxy agent accrue, and no users (e.g., game players) are buying them from the proxy agent, then the proxy agent has to reduce the asking price. In this respect, the proxy agent interface with users simulates a free market environment, where the proxy agent acts as a broker. For example, the proxy agent may measure that users are not interested in this item in exchange for 5 million digital coins (i.e., an asking price of 5 million), and the proxy may conclude that it is also not going to acquire a similar item for that price based on the demand rate. This may be an iterative process by the proxy agent until the proxy agent measures an increase in demand rate for the item at a given price point. In one or more implementations, the proxy agent is configured to maintain an amount of margin above a given asking price for each item to remain profitable.

At a high level, base price is based on rarity. When the interactive environment creates a pack containing multiple items (e.g., digital trading cards), the proxy agent determines what is the weight of each item. The weight may refer to the probability that the item issues in a pack by the interactive environment. In this respect, the lower the weight, the less likely that that item is to issue in a pack. The lower the weight, the higher the base price. In one or more implementations, if the proxy agent had a pack that included every single item in the interactive environment, and the proxy agent stack ranked every single item in the interactive environment based on value, the proxy agent can rank the item based on rarity. For example, if the MESSI item is the absolute best item in the interactive environment, the item would be the rarest one that ever issues in a pack. In another example, if a certain digital trading card (e.g., a 47-rated bronze centerback) is the least-popular item in the interactive environment and it is the lowest-priced item, then the item is very likely the most common item to issue in a pack and, therefore, the proxy agent automatically calculates a base price based on the rarity of the item. In one or more implementations, if the interactive environment creates a new item that is better than the MESSI item (e.g., an item depicting a player of the year RONALDO), then the new item receives a lower base price. In this respect, a lower pack issuance rate or a lower weight than the MESSI item, can result in the new item becoming more valuable on the electronic marketplace. Conversely, the higher the pack issuance rate or higher weight, the lower the base price value.

In one or more implementations, the proxy agent provides a document (or a file) to an item database (e.g., item metadata 244), and the proxy agent may set values to the document at a high level based on multiple factors including, but not limited to, what sports team is the depicted character (e.g., a real professional soccer player) associated with, who the actual player is, what are the player's attributes, etc. In this respect, the proxy agent can determine a base weight value, then the proxy agent can use another formula that takes that base weight value, and computes the base price value. In one or more implementations, the interactive environment receives the document as an input, and processes the received document that contains both values (e.g., the base weight value, the base price value).

Next, in step 504, using the online transaction repository engine 240, the processor 236 searches for an item that is the same type as the item identified from the trigger event. Subsequently, in step 505, using the electronic acquisition engine 241, the processor 236 determines whether the item being searched has been located in the online transaction repository. In this respect, the located item may satisfy the maximum purchase price value, where the asking price of the located item is below (or does not exceed) the maximum purchase price value. If the item being search is located, then the process 500 proceeds to step 506, where the processor 236, using the electronic acquisition engine 241, determines whether a purchase chance control is enabled. If the purchase chance control is enabled, then the process 500 proceeds to region 508, where one or more steps associated with the purchase chance control are executed. Otherwise, the process 500 proceeds to step 507.

Next, in step 507, using the electronic acquisition engine 241, the processor 236 executes a purchase transaction by buying the located item for a buy-now price. In one or more implementations, the buy-now price excludes any government-required taxation costs. Subsequently, the process 236 proceeds to step 520 to initiate the proxy agent listing flow (see FIG. 5C).

Figure 5B:
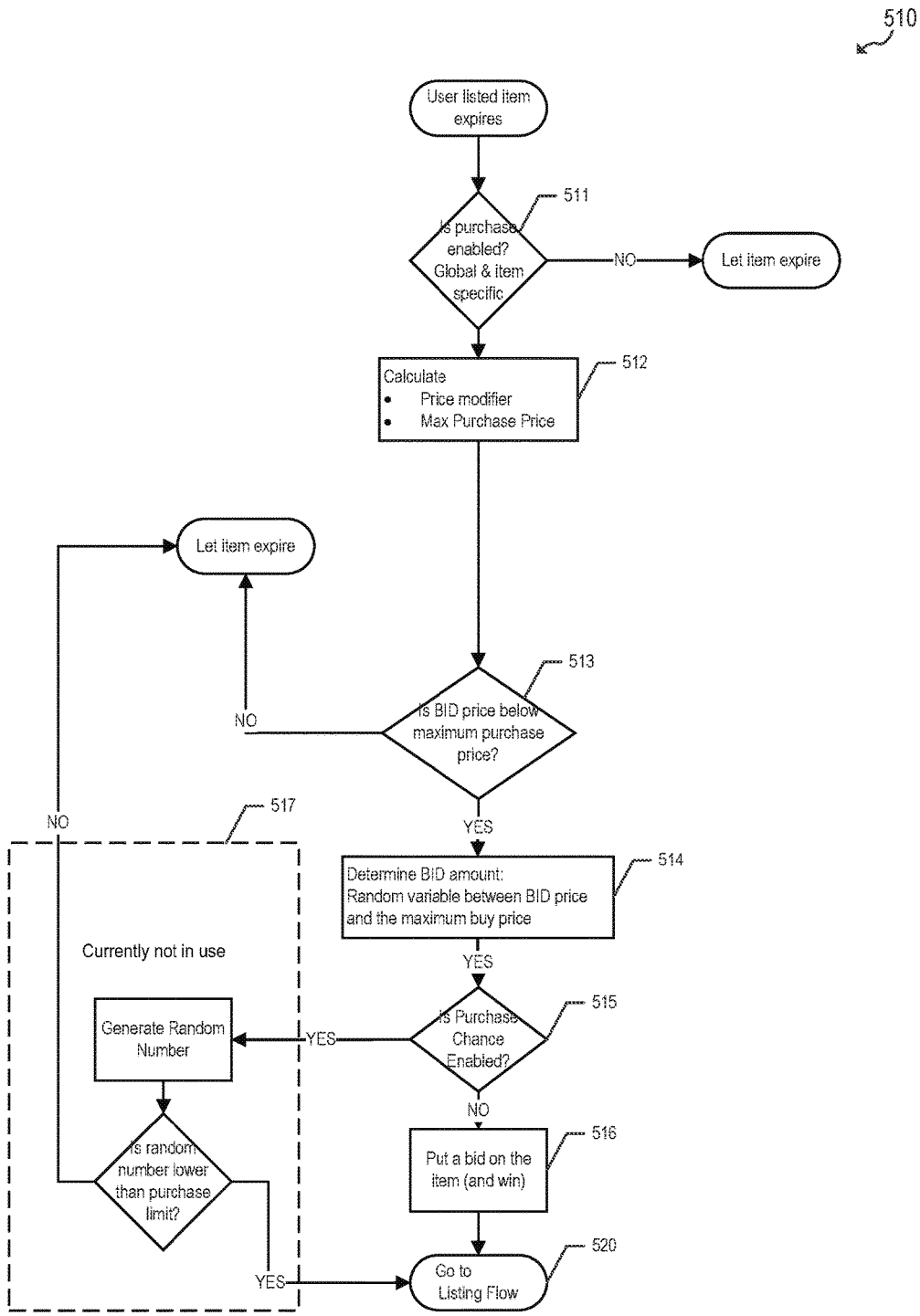
FIG. 5B illustrates another example process of an electronic acquisition transaction to acquire a content item on an online transaction repository using the example server of FIG. 2.

FIG. 5B illustrates another example process 510 of an electronic acquisition transaction to acquire a content item on an online transaction repository using the example server of FIG. 2. While FIG. 5B is described with reference to FIG. 2, it should be noted that the process steps of FIG. 5B may be performed by other systems.

The process 510 begins from the occurrence of a trigger event to step 511 where the processor 236, using the online transaction repository engine 240, determines whether the proxy agent (e.g., server 130) is set with a parameter signaling indicating that purchase control is enabled globally (i.e., for all items) or is item specific. If the purchase control is not enabled, then the process 500 proceeds to a state where the proxy agent allows the item listing to expire. In one or more implementations, the trigger event includes an event where an item listing is set to expire or has already expired depending on implementation. If the purchase control is enabled, then process 500 proceeds to step 512.

In step 512, using the electronic acquisition engine 241, the processor 236 calculates a price modifier value and a maximum purchase price value. The maximum purchase price value may be determined using the price modifier value and a base price for the item. The base price may be determined from a weighted distribution where the base price value may correspond to pricing data from a prior peer-to-peer transaction for that type of item (see FIG. 4C).

Subsequently, in step 513, using the electronic acquisition engine 241, the processor 236 determines whether the item listing set to expire has a bid price that does not exceed the maximum purchase price value. If the bid price exceeds the maximum purchase price value, then the process 510 proceeds to a state where the processor 236 allows the item listing to expire. Otherwise, the process 510 proceeds to step 514.

Next, in step 514, using the electronic acquisition engine 241, the processor 236 determines a bid amount (or value) based on a random variable between the bid price and the maximum purchase price value. The bid amount calculation may be determined using a beta distribution as a function of predetermined alpha and beta values.

When an item listing expires, the proxy agent may determine the minimum price value of the item listing, and the proxy agent may determine a candidate current value for that item based on the base price and supply/demand data (e.g., 245). The proxy agent may apply a random value centered around a bell curve, or at a value centered around a percentage of the difference between the base price value and the random value. For example, the proxy agent may value the MESSI item at 900,000 digital coins, and the item listing for that item indicated a 100 digital coin minimum price and a 1 million digital coin buy-now price. In this respect, the proxy agent may calculate a percentage of the 900,000 digital coin valuation, obtain a value from a random distribution, and then determine that the price valuation would be in a range of 550,000 digital coins to 600,000 digital coins at the time of expiration. The proxy agent may then acquire the item from the selling user at the bid price value (e.g., 550,000 digital coins), and then the proxy agent would re-list the item for a profit at the higher value of what the proxy agent determined the item is worth at that time (e.g., 900,000 digital coins).

The proxy agent uses a beta distribution curve with an alpha value or a beta value, or a combination thereof, depending on implementation. The alpha and beta values adjust the beta distribution curve to have a higher probability of X percent. In FIG. 5B, the alpha value is set to 5 and the beta value is set to 3, but the values may differ depending on implementation. The proxy agent may determine a value from the distribution curve that is between 1% and 100%. In this example, the value likely to return is about 40%.

The process 500 then proceeds to step 515, where the processor 236, using the electronic acquisition engine 241, determines whether a purchase chance control is enabled. If the purchase chance control is enabled, then the process 510 proceeds to region 517, where one or more steps associated with the purchase chance control are executed. Otherwise, the process 510 proceeds to step 516.

Subsequently, in step 517, using the electronic acquisition engine 241, the processor 236 places a bid using the determined bid amount and determines that the bid amount was accepted for purchasing the item. In this respect, the processor 236 executes a purchase transaction by buying the winning item for the accepted bid amount. Subsequently, the process 236 proceeds to step 520 to initiate the proxy agent listing flow (see FIG. 5C).

In the subject technology, the proxy agent duplicated the online auction house so that all the items that are listed by users are only visible to the proxy agent. The proxy agent looks up each item listing because the proxy agent is the only entity that has access to look up all the user-generated item listings. In this respect, the proxy agent decides whether acquire an item and for what value. When the proxy agent acquires items, the proxy agent lists them in a separate auction house, which is the one that all of the players can access. All the items that are listed for sale by the proxy agent are originated from other users, but they were all listed by the proxy agent. The users would not see the exact same item as listed by a user, rather the user would only see items listed by the proxy agent.

Figure 5C:
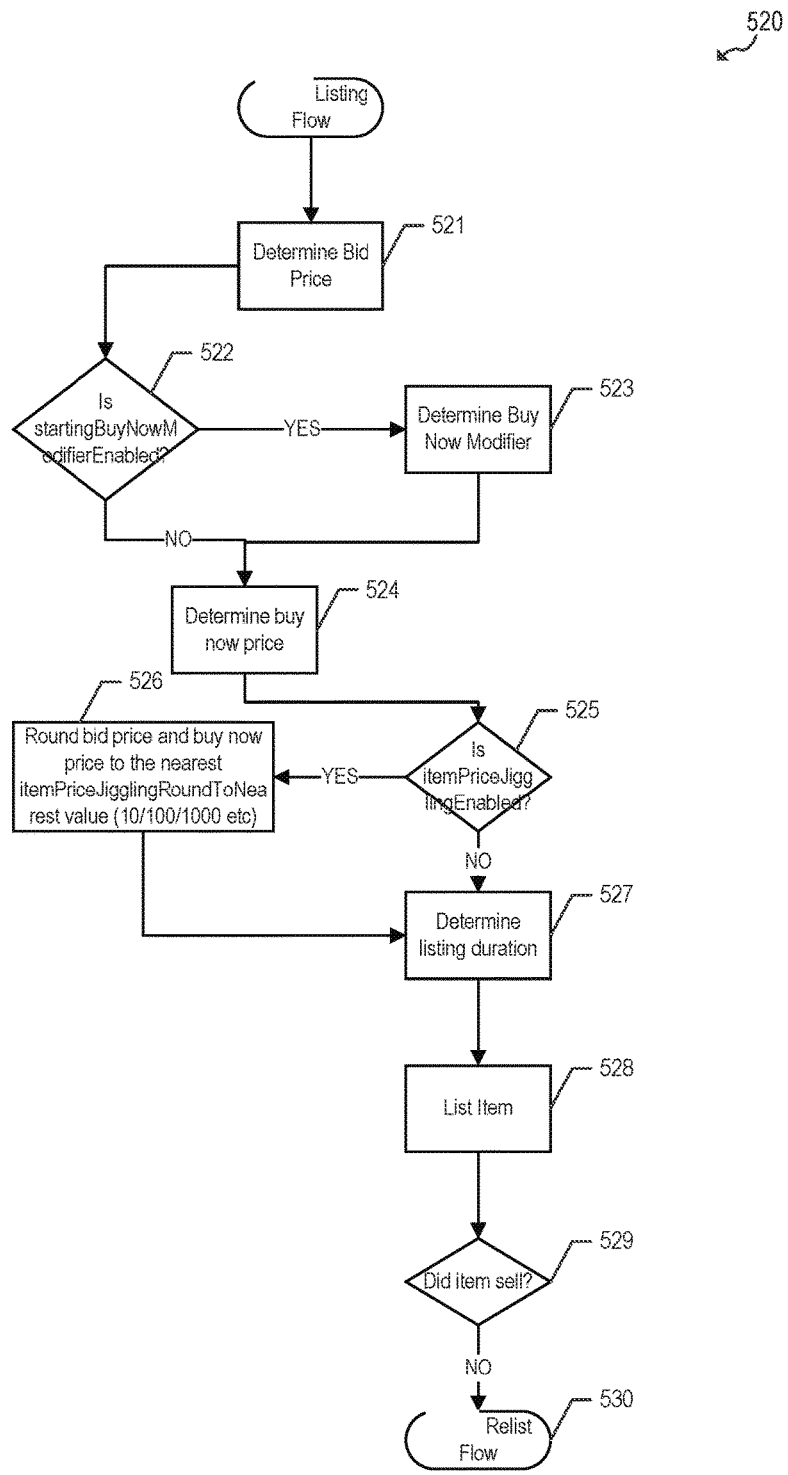
FIG. 5C illustrates an example process of an electronic acquisition transaction to list a content item for acquisition on an online transaction repository using the example server of FIG. 2.

FIG. 5C illustrates an example process 520 of an electronic acquisition transaction to list a content item for acquisition on an online transaction repository using the example server of FIG. 2. While FIG. 5C is described with reference to FIG. 2, it should be noted that the process steps of FIG. 5C may be performed by other systems.

The process 520 begins from the occurrence of a purchase transaction by the proxy agent to step 521, where the processor 236, using the listing engine 242, determines a bid price setting for an item listing identifying the purchased item. The proxy agent has acquired the item and determines the value that it wants to re-list the item for on the selling-side online auction house so that users can view the item listings and then ideally acquire it back from the proxy agent for a profit to the proxy agent. The proxy agent first identifies the price that the proxy agent acquired the item for. For example, if a user listed the MESSI item with an asking price of a million digital coins, the proxy agent may have acquired the item with a winning bid value of 400,000, such that the proxy agent lists the item at a staring bid price of about 400,000.

Next, in step 522, using the listing engine 242, the processor 236 determines whether a starting buy-now modifier signal is enabled. If the starting buy-now modifier signal is enabled, then the process 520 proceeds to step 523. Otherwise, the process 520 proceeds to step 524. In step 523, the processor 236 determines the buy-now modifier parameter. The buy-now modifier may be determined from a weighted random distribution, where the likelihood of an item being purchased at a buy-now price varies for a given buy-now modifier value. For example, the likelihood of the item being purchased at the buy-now price may be 35% (or 0.35) when the buy-now modifier value is set to 1.5, whereas the likelihood decreases to 10% when the buy-now modifier value is set to 3.0. In step 524, the processor 236, using the listing engine 242, determines the buy-now price value.

In one or more implementations, the proxy agent calls the starting buy-now modifier signal, where the proxy agent can modify the starting bid price. The proxy agent may have the modifier parameter set to a weighing value of about 1.0, where the value remains fixed for the life of the item listing. In some aspects, the starting buy-now modifier parameter may bet set to provide the item listing at a value of 400,000 for about 80% of the time, but vary the value (higher or lower) for about 20% of the time.

Subsequently, in step 525, the processor 236 determines whether an item price-jiggling control signal is enabled. If the item price-jiggling control signal is enabled, then the process 520 proceeds to step 526. Otherwise, the process 520 proceeds to step 527. In step 526, using the listing engine 242, the processor 236 rounds the bid price and the buy-now price to the nearest value (e.g., 10/100/1000). In step 527, using the listing engine 242, the processor 236 determines the listing duration. The listing duration may be determined from a weighted random distribution, where the likelihood of the item being sold varies for a given duration. For example, the likelihood that the item would sell at the determined bid price is 40% (or 0.40) when the duration is set to 4 hours, whereas the likelihood decreases to 20% (or 0.20) when the duration is set to 12 hours. Next, in step 528, using the listing engine 242, the processor 236 generates the item listing with the determined parameters (i.e., lists item for sale). Subsequently, the processor 236 determines whether the listed item is sold. If the item is sold, then the processor 236 may provide the sold item to the purchasing party (e.g., the participant device) over a download transmission to the participant device in some embodiments, or stores a copy in a user account associated with the participant device in other embodiments. Otherwise, the process 520 proceeds to a relist flow 530 to relist the item listing (see FIG. 5D).

In one or more implementations, the proxy agent determines the buy-now price by calculating a difference of the price that the proxy agent paid to acquire the item and the price that the proxy agent was willing to pay for the item (e.g., the maximum acquisition value). The proxy agent then utilizes the beta distribution to determine a percentage of the price difference. For example, if the proxy agent was willing to pay a million digital coins for a given item, but the proxy agent acquired the item with a bid price of 400,000, the difference is computed to be about 600,000. In this respect, the proxy agent determines a percentage value of 40% from the distribution curve and applies the percentage to the value of 600,000. The proxy agent then adds the resultant to the value that the proxy agent acquired the item for to then determine the buy-now price. In this example, the proxy agent would list the item for a bid price of about 400,000 with a buy-now price of about 640,000.

Figure 5D:
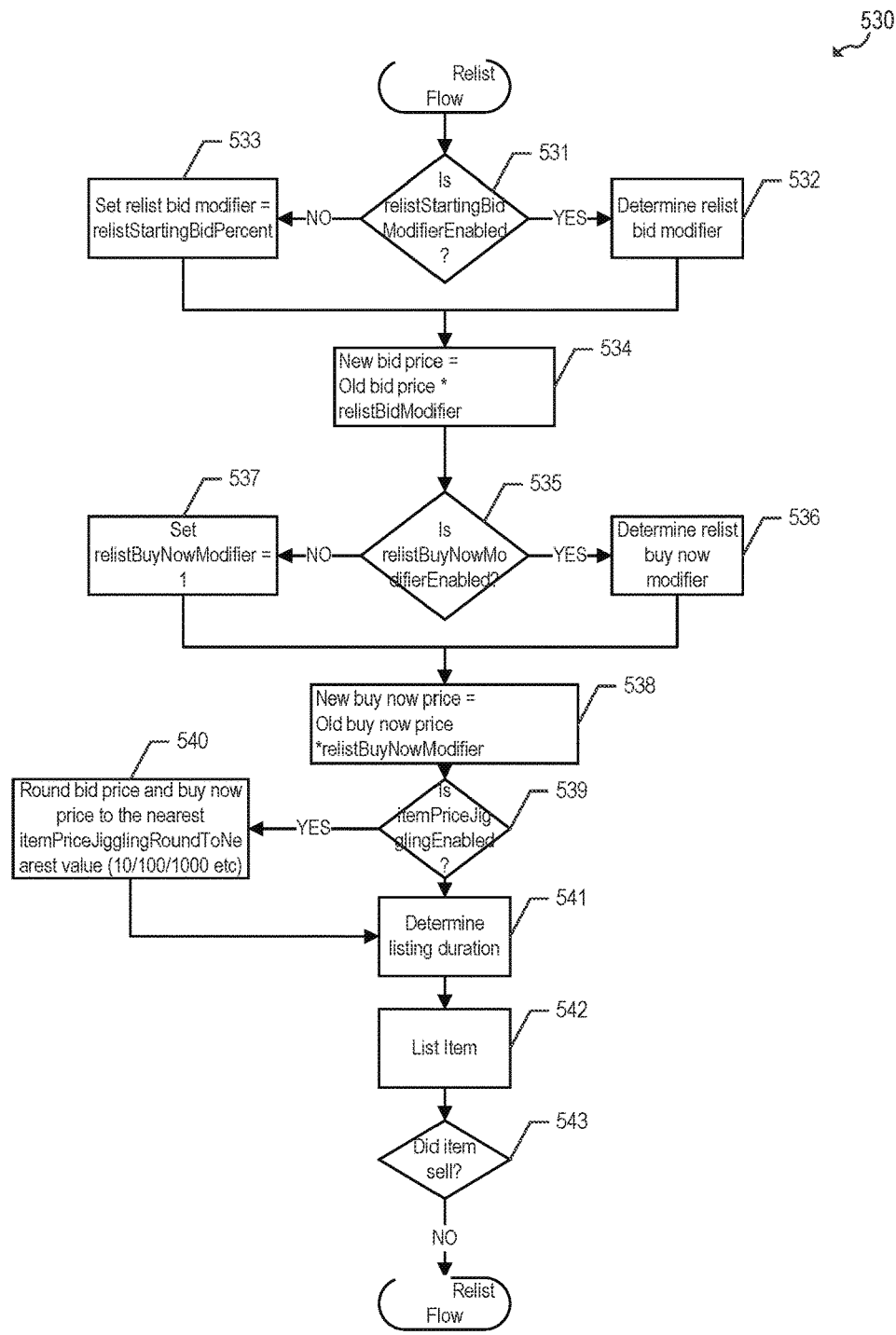
FIG. 5D illustrates an example process of an electronic acquisition transaction to relist a content item for acquisition on an online transaction repository using the example server of FIG. 2.

FIG. 5D illustrates an example process of an electronic acquisition transaction to relist a content item for acquisition on an online transaction repository using the example server of FIG. 2. While FIG. 5D is described with reference to FIG. 2, it should be noted that the process steps of FIG. 5D may be performed by other systems.

The process 530 begins from the occurrence of an item not being sold within the parameters of an item listing to step 531, where the processor 236, using the relisting engine 243, determines whether a relist starting bid modifier control signal is enabled. If the relist starting bid modifier control is enabled, then the process 530 proceeds to step 532. Otherwise, the process 530 proceeds to step 533. In step 532, using the relisting engine 243, the processor 236 determines a relist bid modifier value. The relist bid modifier value may be determined from a weighted random distribution, where the likelihood of an item being purchased at a relist bid price varies for a given relist starting bid modifier value. For example, the likelihood of the item being purchased at the relist bid price may be 33% (or 0.33) when the relist starting bid modifier value is set to 0.9, whereas the likelihood remains about the same at 33% when the relist starting bid modifier value is set to 1.1. In step 533, using the relisting engine 243, the processor 236 sets the relist bid modifier value to a predetermined relist starting bid percent value that is a global parameter.

The bid modifier is the ability for the proxy agent to drop the original item listing price, when the item was not selling. The proxy agent may determine whether to make the price more appealing every time it does not sell within the prescribed time period. The proxy agent may be configured not to hold inventory greater than a threshold inventory level, because every piece of inventory owned by the proxy agent may be a negative factor on the economy given that the proxy agent already incurred a cost for acquiring the item. In some aspect, the proxy agent may be configured to sell an item as quickly as possible by reducing the original price point to a price point that conforms to the market data trends. In one or more implementations, the proxy agent decreases the original asking price by 1% or 2% when an item is relisted in some embodiments, or the proxy agent sets the parameter to 100% where the item is re-listed with no change to the price in other embodiments.

Subsequently, in step 534, using the relisting engine 243, the processor 236 determines a new bid price for the item relisting. The new bid price may be determined based on a product of the prior bid price value and the relist bid modifier value. Next, in step 535, the processor 236 determines whether the relist buy-now modifier control signal is enabled. If the relist buy-now modifier control signal is enabled, then the process 530 proceeds to step 536. Otherwise, the process 530 proceeds to step 537.

In step 536, using the relisting engine 243, the processor 236 determines a relist buy-now modifier value. The relist buy-now modifier value may be determined from a weighted random distribution, where the likelihood of an item being purchased at a relist buy-now price varies for a given relist buy-now modifier value. For example, the likelihood of the item being purchased at the relist buy-now price may be 33% (or 0.33) when the relist buy-now modifier value is set to 0.9, whereas the likelihood remains about the same at 33% when the relist buy-now modifier value is set to 1.1. In step 537, using the relisting engine 243, the processor 236 sets the relist buy-now modifier value to a fixed value (e.g., 1.0).

Subsequently, in step 539, the processor 236 determines whether an item price-jiggling control signal is enabled. If the item price-jiggling control signal is enabled, then the process 520 proceeds to step 540. Otherwise, the process 520 proceeds to step 541. In step 540, using the relisting engine 243, the processor 236 rounds the bid price and the buy-now price to the nearest value (e.g., 10/100/1000). Next, in step 541, using the relisting engine 243, the processor 236 determines the listing duration. The listing duration may be determined from a weighted random distribution, where the likelihood of the item being sold varies for a given duration. For example, the likelihood that the item would sell at the determined bid price is 40% (or 0.40) when the duration is set to 4 hours, whereas the likelihood decreases to 20% (or 0.20) when the duration is set to 12 hours. Next, in step 542, using the relisting engine 243, the processor 236 generates the item relisting with the determined parameters (i.e., relists item for sale). Subsequently, the processor 236 determines whether the relisted item is sold. If the item is sold, then the processor 236 may provide the sold item to the purchasing party (e.g., the participant device) over a download transmission to the participant device in some embodiments, or stores a copy in a user account associated with the participant device in other embodiments. Otherwise, the process 530 proceeds back to the start of the relist flow 530 to relist the item listing.

In one or more implementations, the proxy agent utilizes a different version of the global values for each shard. In this respect, the users do not access (or view) the same online transaction repository because each shard corresponds to a different version of the online transaction repository where different global values are applied to each shard. For example, the proxy agent may have one shard where the proxy agent does not decrease prices, whereas another shard where the proxy agent does increase the prices. In one or more implementations, the users are randomly assigned to a shard when the user initiates the interactive environment. In traditional online auction houses, where a large collection of items for an interactive environment are all hosted in a single auction house, and users are simultaneously bidding and looking at items on the single auction house, the load on the servers can become significantly high. In this respect, the shards employed by the proxy agent help distribute the amount of data traffic (or volume) that is traversing the network tied to the proxy agent at any given point in time by allocating certain data traffic to certain shards of the proxy agent.

In one or more implementations, the proxy agent configures the values for interacting with the online transaction repository and makes them tunable on a per-shard basis. The proxy agent may tune the configuration values such that different user behavior may be monitored on each shard. In some aspects, the proxy agent may determine the impact on user engagement, the impact on user behavior, and the impact on spend conversion. For example, the proxy agent may mark up prices by an average of 10% for items on shard 1, whereas items on Shard 2 have prices marked up by 100% (i.e., double the value). In this example, the proxy agent can run these configuration scenarios on the specified shard for a specified period of time to gather telemetry data from each shard. The gathered telemetry data may then be utilized by the proxy agent to determine an optimal tuning value that increases both player engagement rates and player conversion rates, thereby improving the economic standing of the proxy agent through the online transaction repository. The received feedback (or received telemetry data) triggers the proxy agent to automatically select different global values from its library to cause a change in user interactivity levels with respect to the item listings for a given shard in some embodiments, or the proxy agent provides a user interface to allow a user to manually adjust the global values in response to the received feedback. The received telemetry data may be stored in the item metadata 244 or in the supply/demand data 245, or a combination thereof, depending on implementation. In some aspects, the telemetry data may be stored remotely, and remotely accessible to the server 130.

Figure 6:
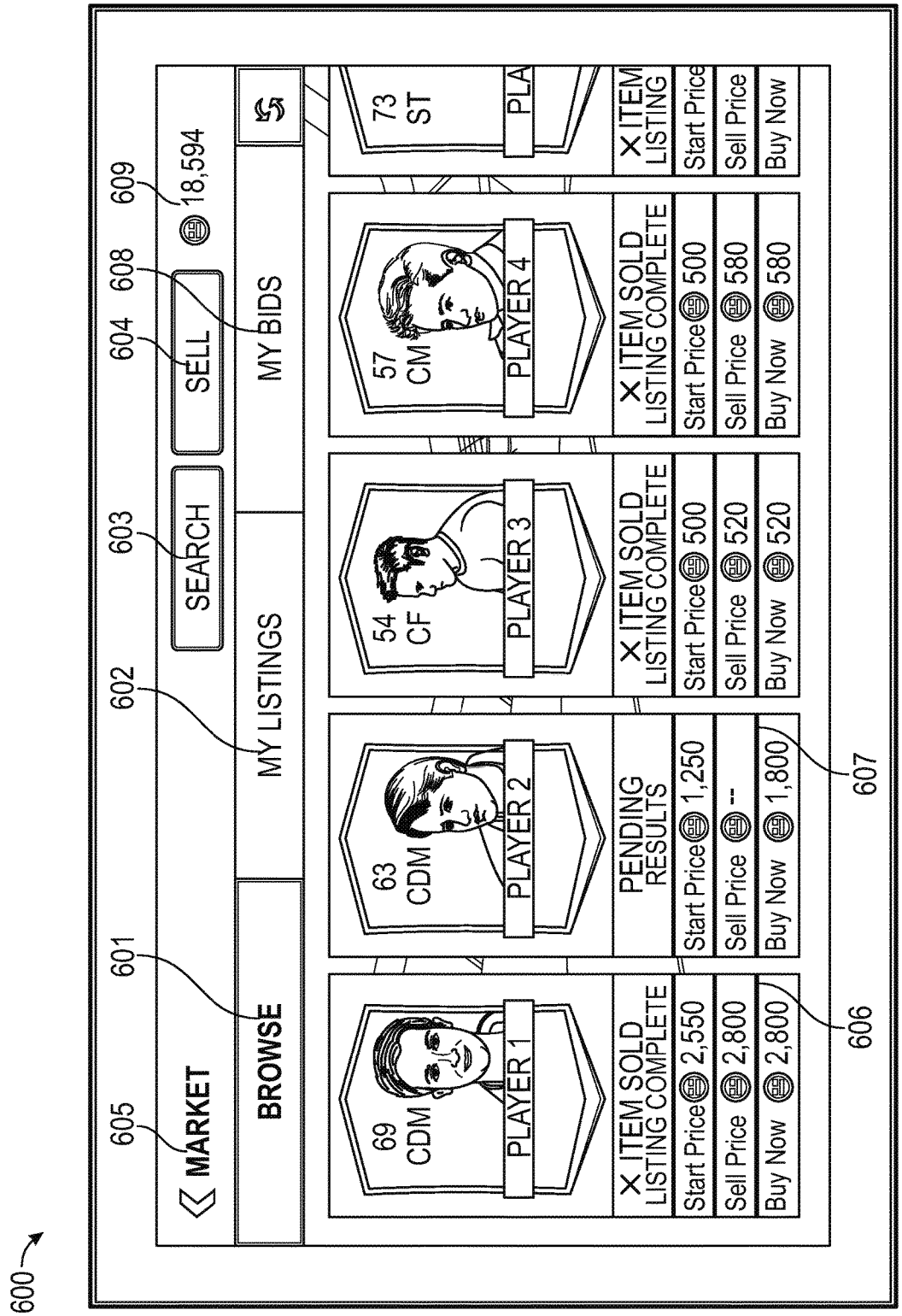
FIG. 6 illustrates an example of a user interface for practicing the example process of FIG. 5A.

FIG. 6 illustrates an example of a user interface 600 for practicing the example process of FIG. 5A via the application 222 of the client 110. In FIG. 6, the user interface 600 depicts a market landing page where potential buyers can search for items on the online transaction repository.

The user interface 600 of the application 222 includes a navigation bar composed of a browse control 601, listings control 602, and active bids control 608. The navigation bar may include a back operation to visit a prior page (or landing page) such as a marketplace portal (e.g., market 605). In FIG. 600, a listing of content items (e.g., digital trading cards) are displayed in a sequential-based layout but the listing of content items may be in a different layout depending on implementation. The listing of content items may include a predetermined layout set by the proxy agent and/or the online transaction repository depending on implementation. For example, the content items may be displayed as an array, where a user may scroll the array to display additional content items.

The listing of content items may include images depicting game characters (e.g., depiction of professional soccer players). The user interface 600 also includes a search control 603 and a sell control 604. The search control 603 may be utilized to search for active listings from other users. The sell control 604 may be utilized to initiate one or more sale transactions of a given content item. The user interface 600 also includes an indication of a quantity of digital coins (e.g., 609) earned and/or purchased by a user (e.g., a tally of digital coins associated with a user's account). Each item in the listing of content items may include an indication of an existing item listing with pricing information on how to purchase the item (e.g., start price value, sell price value (if item sold), or buy-now price value).

Figure 7:
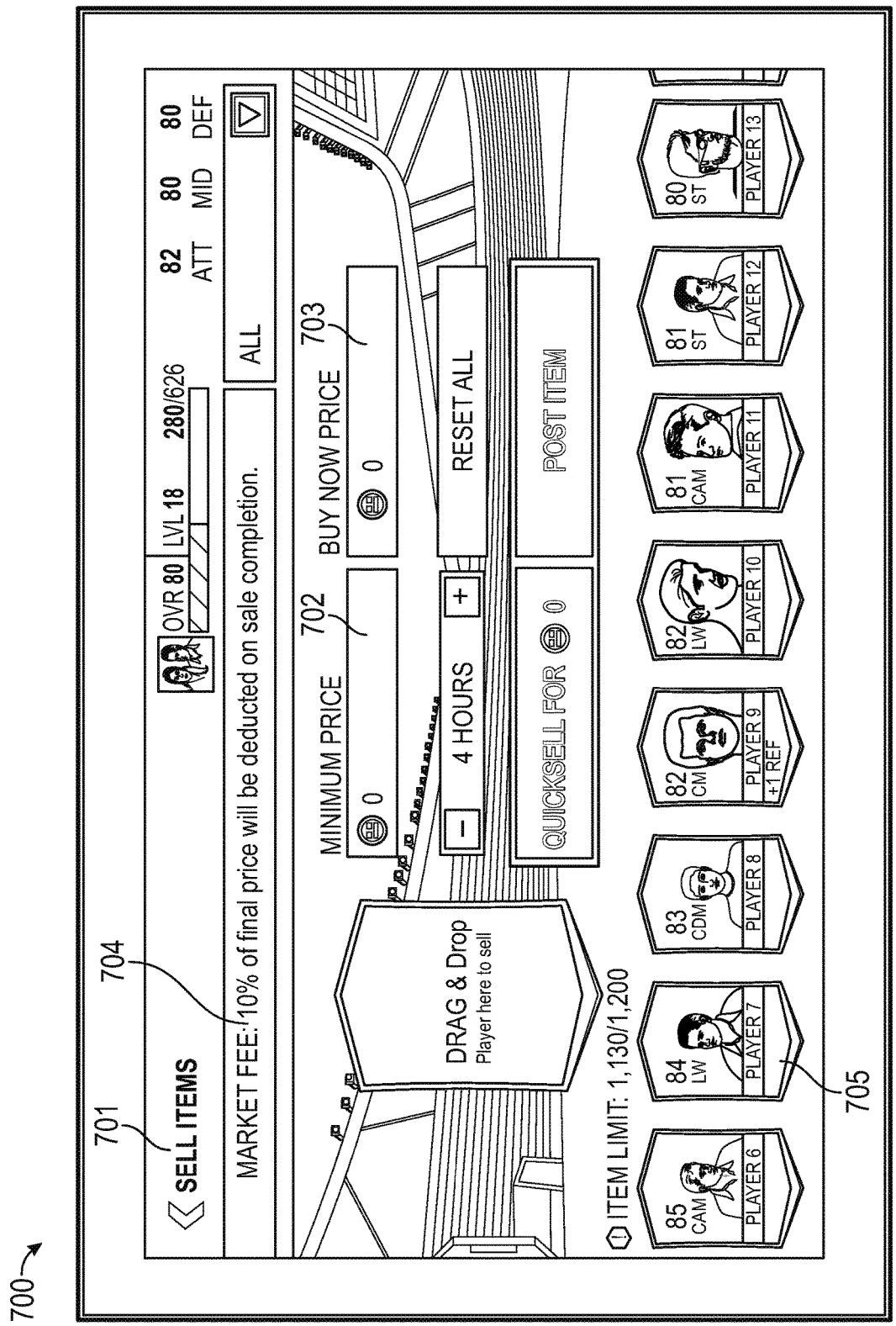
FIG. 7 illustrates an example of a user interface for practicing the example process of FIG. 5C.

FIG. 7 illustrates an example of a user interface for practicing the example process of FIG. 5C via the application 222 of the client 110. In FIG. 7, the user interface 700 depicts a seller landing page where potential sellers can review their inventory and select items to sell. In this respect, the seller landing page can be used to generate an item listing. The user interface 700 includes a browse control 701 for navigating to and from the seller landing page. On the seller landing page, the user interface 700 also includes a minimum price input field 702 and a buy now price input field 703. The listing duration can be set for the item listing. The user interface 700 includes a notification 704 indicating that the proxy agent can collect a percentage of the proceeds from the sale transaction resulting from the item listing. The user interface 700 also includes an array of content items 705 for selection as part of a seller's inventory. The seller's inventory may be associated with a user account of the multiplayer game in some embodiments, or associated with a shard of the online transaction repository in other embodiments.

Figure 8:
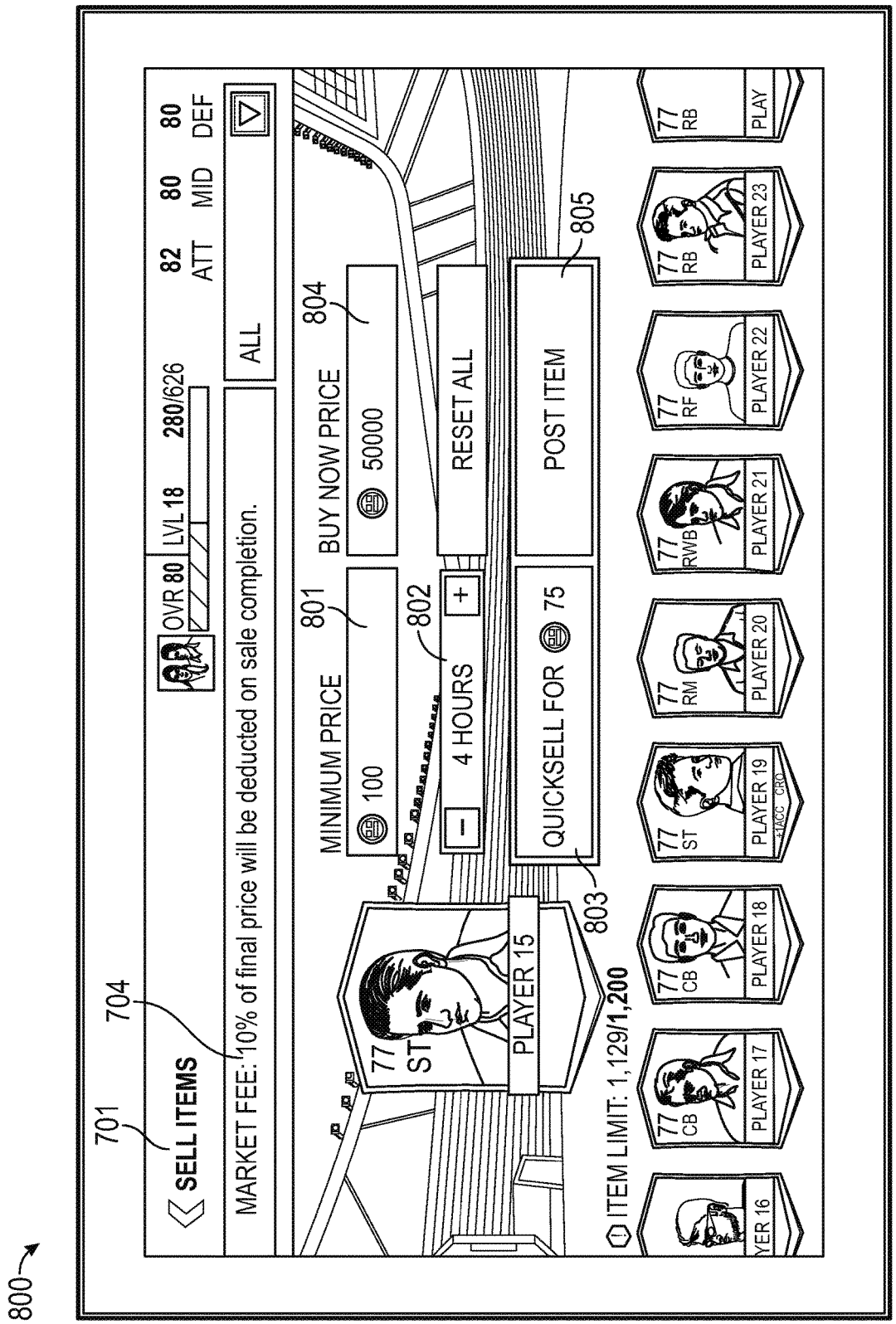
FIG. 8 illustrates an example of a user interface for practicing the example process of FIG. 5C.

FIG. 8 illustrates an example of a user interface for practicing the example process of FIG. 5C via the application 222 of the client 110. In FIG. 8, the user interface 800 depicts another example of a seller landing page where a seller can view when an item to be listed for sale has been selected and a price has been added. In this example, one of the content items from the array of content items has been selected by a drag-and-drop operation, which can be selected using any other type of user input selection operation (e.g., click, double-tap gesture, swiping gesture, etc.) depending on implementation. The minimum price input field 801 includes a first user-selected value (e.g., 100 digital coins), and the buy now price input field 804 includes a second user-selected value (e.g., 50,000 digital coins). The listing duration input field 802 includes a third user-selected value (e.g., 4 hour duration), which indicates how long the item listing will be active before expiring. The user interface 800 also includes a post item control 805 for submitting a control to the proxy agent to confirm instantiation of the item listing on the online transaction repository.

Figure 9:
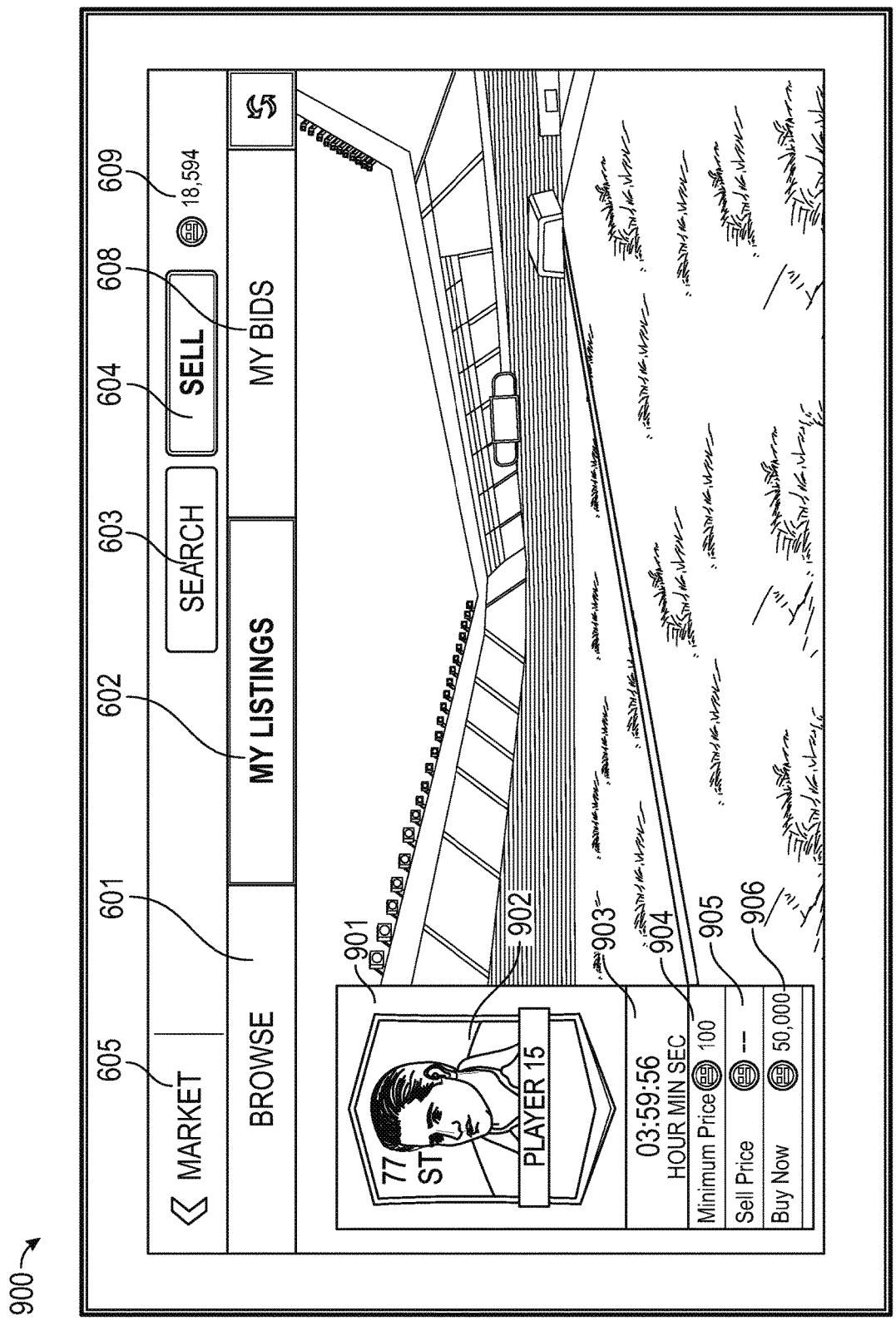
FIG. 9 illustrates an example of a user interface for practicing the example process of FIG. 5A.

FIG. 9 illustrates an example of a user interface for practicing the example process of FIG. 5A via the application 222 of the client 110. In FIG. 9, the user interface 900 depicts another example of a seller landing page where the landing page shows the listings that the seller currently has for sale through the proxy agent. The user interface 900 includes a representation of an item listing 901. The item listing 901 includes a representation of a game character 902 (e.g., an avatar depicting a professional soccer player), a listing duration notification 903, a minimum price setting notification 904, a current sell price notification 905, and a buy-now price notification 906.

Figure 10:
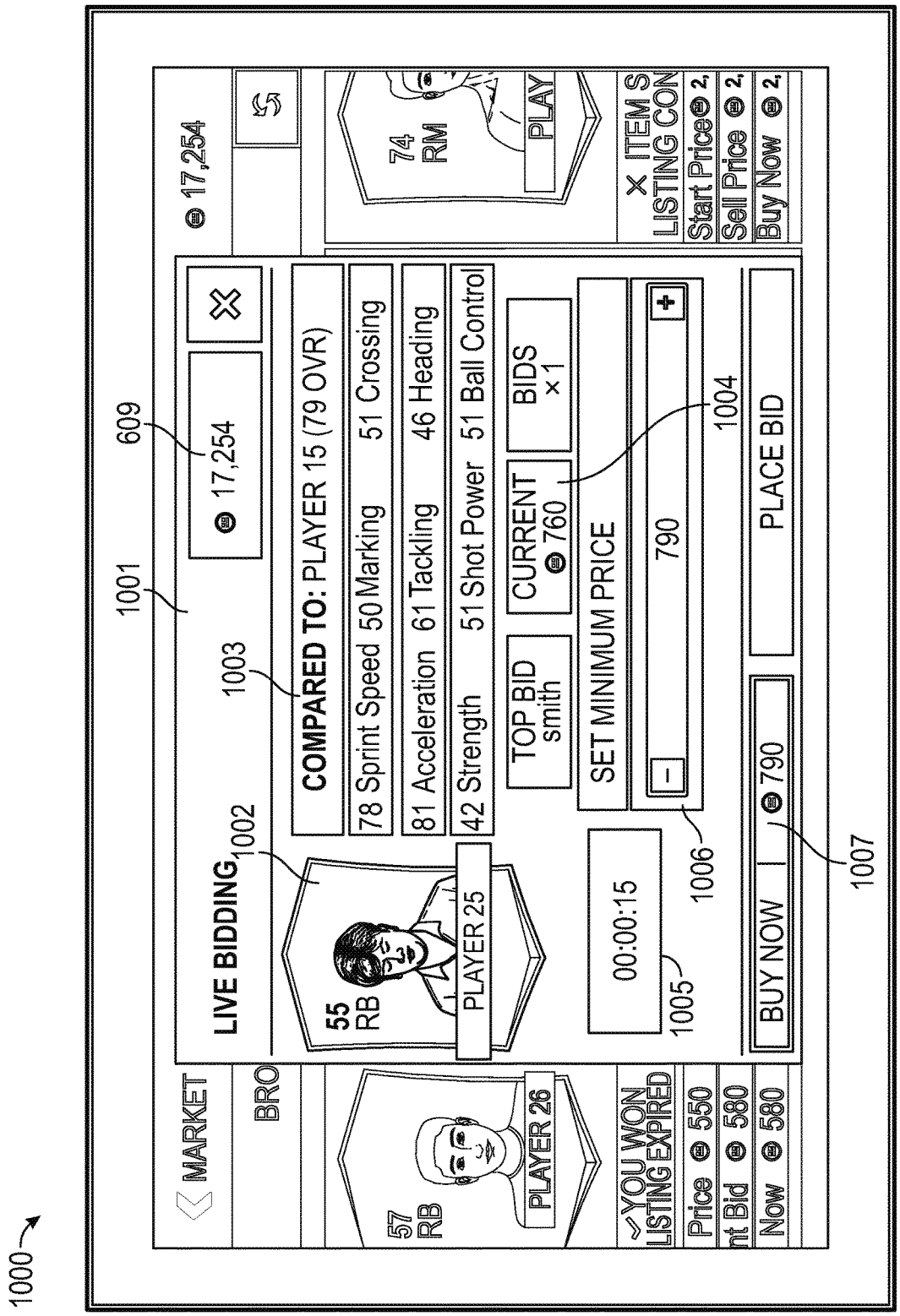
FIG. 10 illustrates an example of a user interface for practicing the example process of FIGS. 5A and 5B.

FIG. 10 illustrates an example of a user interface for practicing the example process of FIGS. 5A and 5B via the application 222 of the client 110. In FIG. 10, the user interface 1000 depicts a buyer landing page where potential buyers can select an item for purchase, either by placing a bid or by initiating a buy-now transaction. The user interface 1000 includes an item listing 1001 that indicates multiple pieces of information about the item. For example, the item listing 1001 includes a representation of a game character 1002, a comparison chart 1003, a listing duration 1005 for the item listing 1001, a current bid price 1006 for the item listing 1001, and a purchase control interface 1007. The purchase control interface 1007 includes a buy now control and a place bid control, where either control can initiate the electronic acquisition transaction for the item listed for sale. The comparison chart 1003 may include a comparison of skill ratings with respect to another game character.

Figure 11:
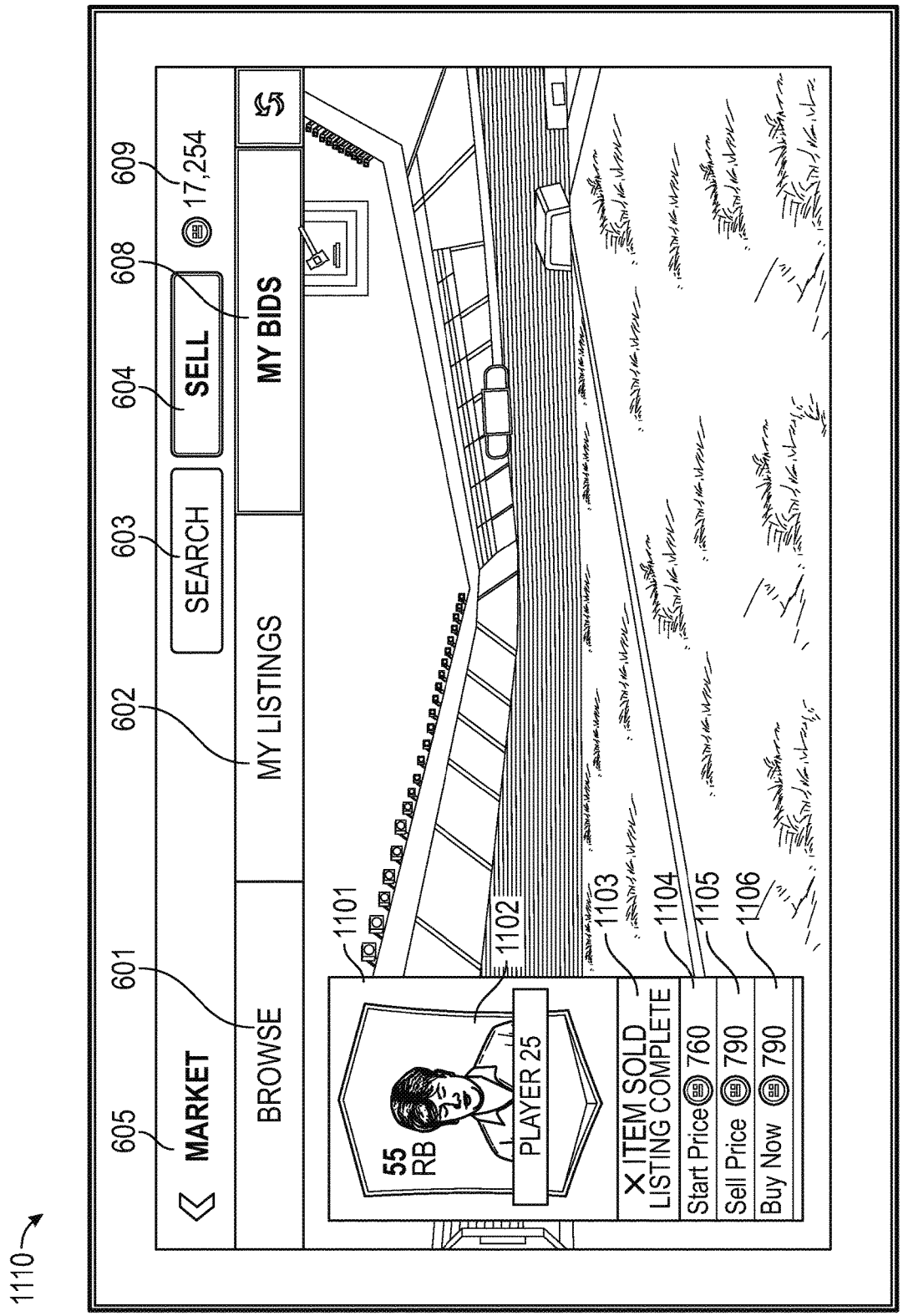
FIG. 11 illustrates an example of a user interface for practicing the example process of FIGS. 5A and 5B.

FIG. 11 illustrates an example of a user interface for practicing the example process of FIGS. 5A and 5B via the application 222 of the client 110. In FIG. 11, the user interface 1100 depicts another example of a buyer landing page where an item listing has a current bid by a potential buyer. The user interface 1100 includes a representation of an item listing 1101 marked as sold. The item listing 1101 includes a representation of a game character 1102 (e.g., an avatar depicting a professional soccer player), a listing duration notification 1103 indicating that the item listing has been completed (i.e., item listing no longer active), a start price setting notification 1104, a selling price notification 1105, and a buy-now price notification 1106. In this example, the item listing 1101 sold at the buy-now price of 790 digital coins, where the bidding for the item started at the bid price of 760 digital coins.

Hardware Overview

Figure 12:
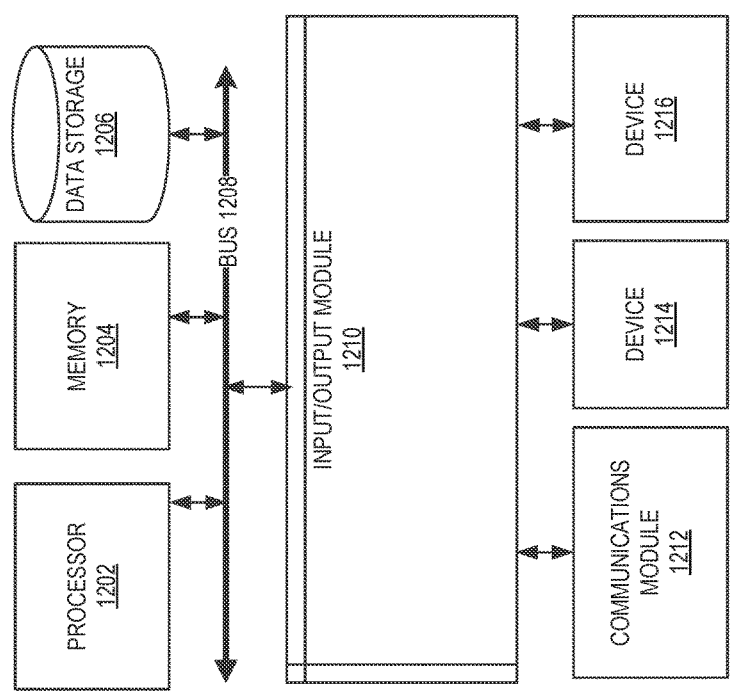
FIG. 12 is a block diagram illustrating an example computer system with which the client and server of FIG. 2 can be implemented.

FIG. 12 is a block diagram illustrating an exemplary computer system 1200 with which the client 110 and server 120 of FIG. 1 can be implemented. In certain aspects, the computer system 1200 may be implemented using hardware or a combination of software and hardware, either in a dedicated server, integrated into another entity, or distributed across multiple entities.

Computer system 1200 (e.g., client 110 and server 120) includes a bus 1208 or other communication mechanism for communicating information, and a processor 1202 (e.g., processor 212 and 236) coupled with bus 1208 for processing information. By way of example, the computer system 1200 may be implemented with one or more processors 1202. Processor 1202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1200 can include, in addition to hardware, code that creates an execution environment for the computer program in question, e.g., code that constitutes processor firmware, a protocol stack, a database management system, an operating system, or a combination of one or more of them stored in an included memory 1204 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1208 for storing information and instructions to be executed by processor 1202. The processor 1202 and the memory 1204 can be supplemented by, or incorporated in, special purpose logic circuitry.

The instructions may be stored in the memory 1204 and implemented in one or more computer program products, i.e., one or more modules of computer program instructions encoded on a computer readable medium for execution by, or to control the operation of, the computer system 1200, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled to bus 1208 for storing information and instructions. Computer system 1200 may be coupled via input/output module 1210 to various devices. The input/output module 1210 can be any input/output module. Exemplary input/output modules 1210 include data ports such as USB ports. The input/output module 1210 is configured to connect to a communications module 1212. Exemplary communications modules 1212 (e.g., communications modules 218 and 238) include networking interface cards, such as Ethernet cards and modems. In certain aspects, the input/output module 1210 is configured to connect to a plurality of devices, such as an input device 1214 (e.g., input device 216) and/or an output device 1216 (e.g., output device 214). Exemplary input devices 1214 include a keyboard and a pointing device, e.g., a mouse or a trackball, by which a user can provide input to the computer system 1200. Other kinds of input devices 1214 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1216 include display devices such as a LCD (liquid crystal display) monitor, for displaying information to the user.

According to one aspect of the present disclosure, the client 110 and server 120 can be implemented using a computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in the main memory 1204 causes processor 1202 to perform the process steps described herein. One or more processors in a multi-processing arrangement may also be employed to execute the sequences of instructions contained in memory 1204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1200 can include clients and servers. A client and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1202 for execution. Such a medium may take many forms, including, but not limited to, non-volatile media, volatile media, and transmission media. Non-volatile media include, for example, optical or magnetic disks, such as data storage device 1206. Volatile media include dynamic memory, such as memory 1204. Transmission media include coaxial cables, copper wire, and fiber optics, including the wires that comprise bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   initiating a connection to an application programming interface (API) of an online transaction repository accessible to a plurality of participant devices in a computer-operated multiplayer interactive environment, the online transaction repository including a collection of items associated with the computer-operated multiplayer interactive environment, the connection being initiated by a proxy agent including a plurality of shards;
   associating a first shard of the plurality of shards to a peer-to-peer transaction channel to the online transaction repository, at least two of the plurality of participant devices interacting with one another over the peer-to-peer transaction channel;
   determining a first item from the collection of items having a transactional history that does not exceed a threshold number of transactions, the first item being associated with a first item listing accessible exclusive to the first shard;
   providing the first item to the peer-to-peer transaction channel via the first shard;
   determining that a trigger event associated with the first item occurred on the peer-to-peer transaction channel;
   obtaining value data associated with the trigger event from the peer-to-peer transaction channel;
   generating a weighted distribution of the obtained value data;
   determining a base value for the first item from the weighted distribution; and
   applying the base value to a second item of a same type as that of the first item for an electronic acquisition transaction with the online transaction repository by the proxy agent, the second item being associated with a second item listing accessible exclusive to a second shard of the plurality of shards.

2. The computer-implemented method of claim 1, wherein the value data comprises at least one or more of a start value, an end value or a listing duration value for the first item, the listing duration value indicating a length of time from when the first item listing was generated to a time when the first item was acquired by an electronic transaction responsive to the first item listing.

3. The computer-implemented method of claim 1, wherein determining the first item having the transactional history comprises:
   determining that the first item exists in metadata of the online transaction repository;
   determining a number of electronic acquisition transactions for the first item over a specified period of time; and
   determining that the number of electronic acquisition transactions does not exceed the threshold number of transactions.

4. The computer-implemented method of claim 1, wherein the value data indicates a number of interactions between participant devices of the plurality of participant devices with respect to the first item over a specified period of time.

5. The computer-implemented method of claim 4, wherein the base value is based on an acquisition metric of the first item from the weighted distribution, the acquisition metric indicating a relationship between the number of interactions and a corresponding base value.

6. The computer-implemented method of claim 1, further comprising:
   determining which of the plurality of shards to associate with the peer-to-peer transaction channel based on a random distribution indicating a different selection of one of the plurality of shards at different times.

7. The computer-implemented method of claim 6, further comprising:
   disassociating the first shard from the peer-to-peer transaction channel;
   associating the second shard to the peer-to-peer transaction channel based on the random distribution; and
   obtaining additional value data from the peer-to-peer transaction channel via the second shard.

8. The computer-implemented method of claim 1, wherein applying the base value to the second item comprises:
   adjusting one or more parameters of the second item listing based on the base value determined from the weighted distribution.

9. The computer-implemented method of claim 1, wherein determining that the trigger event occurred comprises:
   determining whether an item listing for the first item either resulted in a sale transaction or the item listing expired.

10. The computer-implemented method of claim 1, further comprising:
    determining whether to initiate a sale transaction or an acquisition transaction with the online transaction repository;
    determining when to acquire a specified item using one or more base values from the weighted distribution when it is determined to initiate the acquisition transaction; and
    determining when to generate an item listing for the specified item using the one or more base values from the weighted distribution when it is determined to initiate the sale transaction.

11. The computer-implemented method of claim 1, wherein determining the base value comprises:
    determining a weight value for each base price pairing in the weighted distribution, the base price pairing indicating a relationship between a given price point and a corresponding listing duration for the first item, the weight value indicating a number of interactions with the first item in the online transaction repository at the given price point; and
    calculating the base value from a logarithmic equation as a function of the determined weight values.

12. A system, comprising:
    a memory; and
    one or more processors storing instructions thereon, which when executed by the one or more processors, cause the one or more processors to perform operations, the operations comprising:
        initiating a connection to an application programming interface (API) of an online transaction repository accessible to a plurality of participant devices in a computer-operated multiplayer interactive environment, the online transaction repository including a collection of items associated with the computer-operated multiplayer interactive environment, the connection being initiated by a proxy agent including a plurality of shards;
        associating a first shard of the plurality of shards to a peer-to-peer transaction channel to the online transaction repository, at least two of the plurality of participant devices interacting with one another over the peer-to-peer transaction channel;
        determining a first item from the collection of items having a transactional history that does not exceed a threshold number of transactions, the first item being associated with an item listing accessible exclusive to the first shard;
        providing the first item to the peer-to-peer transaction channel via the first shard;
        determining that a trigger event associated with the first item occurred on the peer-to-peer transaction channel;
        obtaining value data associated with the trigger event from the peer-to-peer transaction channel;
        generating a weighted distribution of the obtained value data;
        determining a base value for the first item from the weighted distribution; and
        applying the base value to a second item of a same type as that of the first item for an electronic acquisition transaction with the online transaction repository by the proxy agent, the second item being associated with an item listing accessible exclusive to a second shard of the plurality of shards.

13. The system of claim 12, wherein determining the first item having the transactional history comprises:
    determining that the first item exists in metadata of the online transaction repository;
    determining a number of electronic acquisition transactions for the first item over a specified period of time; and
    determining that the number of electronic acquisition transactions does not exceed the threshold number of transactions.

14. The system of claim 12, wherein the value data indicates a number of interactions between participant devices of the plurality of participant devices with respect to the first item over a specified period of time.

15. The system of claim 14, wherein the base value is based on an acquisition metric of the first item from the weighted distribution, the acquisition metric indicating a relationship between the number of interactions and a corresponding base value.

16. The system of claim 12, further comprising:
determining which of the plurality of shards to associate with the peer-to-peer transaction channel based on a random distribution indicating a different selection of one of the plurality of shards at different times.

17. The system of claim 16, wherein the operations further comprise:
disassociating the first shard from the peer-to-peer transaction channel;
associating the second shard to the peer-to-peer transaction channel based on the random distribution; and
obtaining additional value data from the peer-to-peer transaction channel via the second shard.

18. A non-transitory computer readable storage medium including instructions that, when executed by a processor, cause the processor to perform operations, the operations comprising:
initiating a connection to an application programming interface (API) of an online transaction repository accessible to a plurality of participant devices in a computer-operated multiplayer interactive environment, the online transaction repository including a collection of items associated with the computer-operated multiplayer interactive environment, the connection being initiated by a proxy agent including a plurality of shards;
associating a first shard of the plurality of shards to a peer-to-peer transaction channel to the online transaction repository, at least two of the plurality of participant devices interacting with one another over the peer-to-peer transaction channel;
determining a first item from the collection of items having a transactional history that does not exceed a threshold number of transactions, the first item being associated with an item listing accessible exclusive to the first shard;
providing the first item to the peer-to-peer transaction channel via the first shard;
determining that a trigger event associated with the first item occurred on the peer-to-peer transaction channel;
obtaining value data associated with the trigger event from the peer-to-peer transaction channel;
generating a weighted distribution of the obtained value data;
determining a base value for the first item from the weighted distribution; and
applying the base value to a second item of a same type as that of the first item for an electronic acquisition transaction with the online transaction repository by the proxy agent, the second item being associated with an item listing accessible exclusive to a second shard of the plurality of shards.

19. The non-transitory computer readable storage medium of claim 18, wherein the operations further comprise:
adjusting one or more parameters of the second item listing based on the base value determined from the weighted distribution.

20. The non-transitory computer readable storage medium of claim 18, wherein the operations further comprise:
determining whether an item listing for the first item either resulted in a sale transaction or the item listing expired.

* * * * *